(12) United States Patent
Wang

(10) Patent No.: US 9,794,558 B2
(45) Date of Patent: Oct. 17, 2017

(54) SUPPORT OF NON-HEVC BASE LAYER IN HEVC MULTI-LAYER EXTENSIONS

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 467 days.

(21) Appl. No.: 14/590,922

(22) Filed: Jan. 6, 2015

(65) Prior Publication Data

US 2015/0195528 A1 Jul. 9, 2015

Related U.S. Application Data

(60) Provisional application No. 61/925,149, filed on Jan. 8, 2014.

(51) Int. Cl.
| | |
|---|---|
| *H04N 19/105* | (2014.01) |
| *H04N 19/30* | (2014.01) |
| *H04N 19/59* | (2014.01) |
| *H04N 19/136* | (2014.01) |
| *H04N 19/187* | (2014.01) |
| *H04N 19/29* | (2014.01) |
| *H04N 19/33* | (2014.01) |

(Continued)

(52) U.S. Cl.
CPC ......... *H04N 19/105* (2014.11); *H04N 19/136* (2014.11); *H04N 19/187* (2014.11); *H04N 19/29* (2014.11); *H04N 19/30* (2014.11); *H04N 19/33* (2014.11); *H04N 19/39* (2014.11); *H04N 19/59* (2014.11); *H04N 19/70* (2014.11)

(58) Field of Classification Search
CPC ...... H04N 19/105; H04N 19/30; H04N 19/59; H04N 19/70
See application file for complete search history.

(56) References Cited

U.S. PATENT DOCUMENTS

| | | |
|---|---|---|
| 2012/0075436 A1 | 3/2012 | Chen et al. |
| 2013/0089152 A1 | 4/2013 | Wang et al. |
| 2013/0094585 A1 | 4/2013 | Misra et al. |

(Continued)

OTHER PUBLICATIONS

Bossen F., "Common test conditions and software reference configurations," 7th Meeting: Nov. 21-30, 2011, Geneva, CH, Joint Collaborative Team on Video Coding (JCT-VC) of ITU-T SG16 WP3 and ISO/IEC JTC1/SC29/WG11, Document: JCTVC-G1200, WG11 No. m22869, 2011, 4 pages.

(Continued)

*Primary Examiner* — Nam Pham

(57) ABSTRACT

An apparatus configured to code video information includes a memory and a processor in communication with the memory. The memory is configured to store video information associated with a bitstream. The apparatus further includes a processor in communication with the memory, the processor configured to determine whether a reference layer is included in the bitstream. The processor is further configured to determine, based upon whether the reference layer is included in the bitstream, whether or not to process an indication and to, if the reference layer is included in the bitstream, process, in a video bitstream, the indication. The processor is also configured to code the video information based at least in part on the processed indication.

30 Claims, 10 Drawing Sheets

(51) Int. Cl.
   *H04N 19/39* (2014.01)
   *H04N 19/70* (2014.01)

(56) References Cited

U.S. PATENT DOCUMENTS

| | | | |
|---|---|---|---|
| 2013/0094773 A1 | 4/2013 | Misra et al. | |
| 2013/0182755 A1 | 7/2013 | Chen et al. | |
| 2013/0195205 A1 | 8/2013 | Wang et al. | |
| 2013/0266076 A1 | 10/2013 | Wang et al. | |
| 2013/0272430 A1 | 10/2013 | Sullivan et al. | |
| 2013/0273945 A1 | 10/2013 | Deshpande et al. | |
| 2014/0003505 A1 | 1/2014 | Lainema et al. | |
| 2014/0301440 A1 | 10/2014 | Narasimhan et al. | |
| 2014/0301451 A1 | 10/2014 | Deshpande | |
| 2014/0301452 A1 | 10/2014 | Deshpande | |
| 2014/0301482 A1 | 10/2014 | Narasimhan et al. | |
| 2014/0359154 A1 | 12/2014 | Tripathy et al. | |
| 2015/0195529 A1 | 7/2015 | Wang | |
| 2015/0195548 A1 | 7/2015 | Wang | |
| 2015/0195549 A1 | 7/2015 | Wang | |
| 2015/0215632 A1 | 7/2015 | Choi et al. | |
| 2015/0229967 A1 | 8/2015 | Lee | |
| 2015/0237377 A1 | 8/2015 | Hendry et al. | |
| 2015/0304665 A1 | 10/2015 | Hannuksela et al. | |
| 2015/0312581 A1 | 10/2015 | Sato | |
| 2015/0373354 A1* | 12/2015 | Choi | H04N 19/46 375/240.02 |
| 2016/0134868 A1 | 5/2016 | He et al. | |
| 2016/0198169 A1 | 7/2016 | Lee et al. | |
| 2016/0249057 A1 | 8/2016 | Lee et al. | |
| 2016/0261878 A1 | 9/2016 | Deshpande | |
| 2016/0261881 A1 | 9/2016 | Deshpande | |
| 2016/0323590 A1 | 11/2016 | Li et al. | |

OTHER PUBLICATIONS

Chong I.S., et al., "CE2.A.1: Signalling mode change from slice header mode to interleaving mode," 9th Meeting: Apr. 27-May 7, 2012, Geneva, CH, Joint Collaborative Team on Video Coding (JCT-VC) of ITU-T SG 16 WP 3 and ISO/IEC JTC 1/SC 29/WG 11, Document: JCTVC-I0249, 2012, 6 pages.
Fuldseth A., et al., "ALF with low latency and reduced complexity for HEVC," 6th Meeting: Jul. 14-22, 2011, Torino; IT, Joint Collaborative Team on Video Coding (JCT-VC) of ITU-T SG16 WP3 and ISO/IEC JTC1/SC29/WG11, Document: JCTVC-F542, 2011, 3 pages.
Fuldseth A., et al., "CE8.a.2: ALF with LCU-based syntax", 8. JCT-VC Meeting; 99. MPEG Meeting; Jan. 2, 2012-Oct. 2, 2012; San Jose; (Joint Collaborative Team on Video Coding of ISO/IEC JTC1/SC29/WG11 and ITU-T SG.16 ); URL: http://wftp3.itu.int/av-arch/jctvc-site/,, No. JCTVC-H0066, Jan. 20, 2012 (Jan. 20, 2012), pp. 1-11, XP030111093.
Fuldseth A et al., "Improved ALF with low latency and reduced complexity" 7th Meeting; Nov. 21, 2011-Nov. 30, 2011; Geneva; (Motion Picture Expert Group or ISO/IEC JTC1/SC29/WG11), Document: JCTVC-G499, No. m22063, Nov. 22, 2011 (Nov. 22, 2011), XP030050626, pp. 1-7.
Yamakage, T., et al., "Description of Core Experiment 8 (CE8): Non-deblocking loop filtering," 6th Meeting: Jul. 14-22, 2011, Torino; IT, Joint Collaborative Team on Video Coding (JCT-VC) of ITU-T SG16 WP3 and ISO/IEC JTC1/SC29/WG11, Document: JCTVC-G1208r1, WG11 No. m22849, 2011, 15 pages.
Chen, et al., "High efficiency video coding (HEVC) scalable extension Draft 4," JCT-3V Meeting; Oct. 23-Nov. 1, 2013; (The Joint Collaborative Team on 3D Video Coding Extension Development of ISO/IEC JTC1/SC29/WG11 and ITU-T SG.16 ); Nov. 14, 2013; Document: JCTVC-O1008_v1, 76 pages.
Chen J., et al., "MV-HEVC/SHVC HLS: SEI message cleanups (incorporated in HEVC scalable extension Draft 5 JCTVC-P1008_v4)", Joint Collaborative Team on Video Coding (JCT-VC) of ITU-T SG 16 WP 3 and ISO/I EC JTC 1, JCT3V-H0082/JCTVC-Q0183 Appendix, Mar. 25, 2014 (Mar. 25, 2014), pp. i-vi, 1-126, XP55216855, Retrieved from the Internet: URL: htip://phenix.int-evry.fr/jct2/.
Fogg C., et al., "Indication of SMPTE 2084, 2085 and Carriage of 2086 Metadata in HEVC", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL:http://wftp3.itu.int/AV-ARCH/JCTVC-SITE/<span style="font-family: calibri;">, No. JCTVC-P0084-v2, Jan. 14, 2014 (Jan. 14, 2014), XP030115562.
Wang, et al., "AHG15: Support of hybrid scalability," {Joint Collaborative Team on Video Coding of ISO/ IEC JTC1/SC29/WG11 and ITU-T SG.16); Mar. 27-Apr. 14, 2014, Document No. JCTVC-00042_v1, Mar. 6, 2014; 3 pp.
Deshpande S., "On Inter-layer Reference Picture Set," 15. JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-00120-v3, Oct. 27, 2013 (Oct. 27, 2013), 8 pages; XP030115122.
Sullivan G. J. et al., "Overview of the High Efficiency Video Coding (HEVC) Standard", IEEE Transactions on Circuits and Systems for Video Technology, Jan. 1, 2012 (Jan. 1, 2012), pp. 1-19, XP055045358, ISSN: 1051-8215, DOI: 10.1109/TCSVT.2012.2221191.
Hannuksela M.M., "MV-HEVC/SHVC HLS: On non-HEVC Base Layer," 7. JCT-3V Meeting; Nov. 1, 2014-Jan. 17, 2014; San Jose; (The Joint Collaborative Team on 3D Video Coding Extension Development of ISO/IEC JTC1/SC29/WG11 and ITU-T SG.16); URL: http://phenix.int-evry.fr/jct2/, No. JCT3V-G0140, Jan. 3, 2014 (Jan. 3, 2014), 4 pages; XP030131918.
International Search Report and Written Opinion—PCT/US2015/010495—ISA/EPO—Mar. 6, 2015.
Lu S., et al., "AHG9: Inter-layer RPS Prediction," 13. JCT-VC Meeting; 104. MPEG Meeting; Apr. 18, 2013 to Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0140, Apr. 9, 2013 (Apr. 9, 2013), 9 Pages; XP030114097.
Narasimhan S. et al., "Consideration of buffer management issues HEVC scalability", 14. JCT-VC Meeting; Jul. 25, 2013-Feb. 8, 2013; Vienna; (Joint Collaborative Team on Video Coding of ISO/IEC JTC1/SC29/WG11 and ITU-T SG.16); URL: http://wftp3.itu.int/av-arch/jctvc-site/ No. JCTVC-N0049, Jul. 12, 2013, 6 Pages; XP030114477.
Narasimhan S. et al., "Multilayer HRD Management", 15. JCT-VC Meeting; Oct. 23, 2013-Nov. 1, 2013; Geneva; (Joint Collaborative Team on Video Coding of ISO/IEC JTC1/SC291 WG11 and ITU-T SG.16); URL: http://WFTP3.itu.int/av-arch/jctvc-site No. JCTVC-00234, Oct. 15, 2013, 4 Pages; XP030115288.

\* cited by examiner

SUPPORT OF NON-HEVC BASE LAYER IN HEVC MULTI-LAYER EXTENSIONS

INCORPORATION BY REFERENCE TO PRIORITY APPLICATION(S)

This application claims priority to U.S. Provisional No. 61/925,149, filed Jan. 8, 2014.

TECHNICAL FIELD

This disclosure relates to the field of video coding and compression, particularly to scalable video coding (SVC), multiview video coding (MVC), or three-dimensional (3D) video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. In SVC, the BL can carry video data with a base level of quality. The one or more ELs can carry additional video data to support, for example, higher spatial, temporal, and/or signal-to-noise (SNR) levels. ELs may be defined relative to a previously encoded layer. For example, a bottom layer may serve as a BL, while a top layer may serve as an EL. Middle layers may serve as either ELs or RLs, or both. For example, a layer in the middle may be an EL for the layers below it, such as the BL or any intervening ELs, and at the same time serve as a RL for one or more ELs above it. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, a current block in the EL may be coded (e.g., encoded or decoded) using the information derived from a RL. For example, a current block in the EL may be coded using the information (e.g., texture information or motion information) of a co-located block in the RL (the term "co-located" as used in the present disclosure may refer to a block in another layer that corresponds to the same image as the current block, e.g., the block that is currently being coded). In some implementations, whether a particular RL is used to code an EL may be signaled as a flag or syntax element. If the flag or syntax element indicates that the particular RL is used to code the EL, another flag or syntax element may further be signaled to indicate what kind of information in the particular reference picture is used to code the EL, such as, for example: texture (pixel) information, motion information, or both.

In certain cases, a portion of the information in the RL may not be available for use in coding the EL. For example, in some implementations, if the RL is coded using a non-HEVC codec, the motion information of the RL may not be available to an HEVC codec to code the EL. In such a case, the EL may still be coded using the texture information of the RL, but the motion information of the RL cannot be used to code the EL.

By exploiting this dependence of the availability of certain types of information in the RL on the type of codec used for coding the RL, some of the processing that is performed to determine what type of information is derived from the RL may be omitted (e.g., if the information is unavailable, there is no need to check whether that information is used for coding the EL), thus resulting in improved coding efficiency and/or reduced computational complexity.

The systems, methods and devices of this disclosure each have several innovative aspects, no single one of which is solely responsible for the desirable attributes disclosed herein.

In one aspect, the present disclosure describes a method of coding video information, the method including determining whether a reference layer is included in a bitstream. The method further includes determining, based upon whether the reference layer is included in the bitstream, whether or not to process an indication and, if the reference layer is included in the bitstream, processing, in a video bitstream, the indication. The method also includes coding the video information based at least in part on the processed indication.

In some aspects, the reference layer may be coded according to a non-HEVC (High Efficiency Video Coding) codec or according to an Advanced Video Coding (AVC) codec. Determining whether the reference layer is included in a bitstream may include determining whether the reference layer is included in a bitstream based upon a value of a flag or a variable. Determining, based upon whether the reference layer is included in a bitstream, whether or not to process the indication may include determining whether or not the indication is redundant based upon whether the reference layer is included in the bitstream. In some aspects, the indication may include an indication that the reference layer may be used for one or more of sample prediction and motion prediction of at least one enhancement layer (EL). The indication may include an indication of a number of sub-layers for a particular layer. In one aspect, the indication may include an indication of whether a first layer may be used for inter-layer prediction for a second layer. The indication may include one or more values in a data array. Coding video information may include at least one of encoding and decoding video information.

One aspect of the present disclosure provides an apparatus configured to code video information. The apparatus includes a memory configured to store video information associated with a bitstream. The apparatus further includes a processor in communication with the memory. The processor is configured to determine whether a reference layer is included in the bitstream and to determine, based upon whether the reference layer is included in the bitstream, whether or not to process an indication. The processor is further configured to, if the reference layer is included in the bitstream, process, in a video bitstream, the indication and code the video information based at least in part on the processed indication.

In one aspect, a non-transitory computer readable medium comprising code that, when executed, causes an apparatus to perform a process is disclosed. The process includes determining whether a reference layer is included in a bitstream and determining, based upon whether the reference layer is included in the bitstream, whether or not to process an indication. The process further includes, if the reference layer is included in the bitstream, processing, in a video bitstream, the indication, and coding the video information based at least in part on the processed indication.

One aspect of the present disclosure provides a video coding device configured to code video information. The video coding device includes means for determining whether a reference layer is included in a bitstream and means for determining, based upon whether the reference layer is included in the bitstream, whether or not to process an indication. The device further includes means for processing the indication in a video bitstream if the reference layer is included in the bitstream and means for coding the video information based at least in part on the processed indication.

DETAILED DESCRIPTION

Figure 1A:
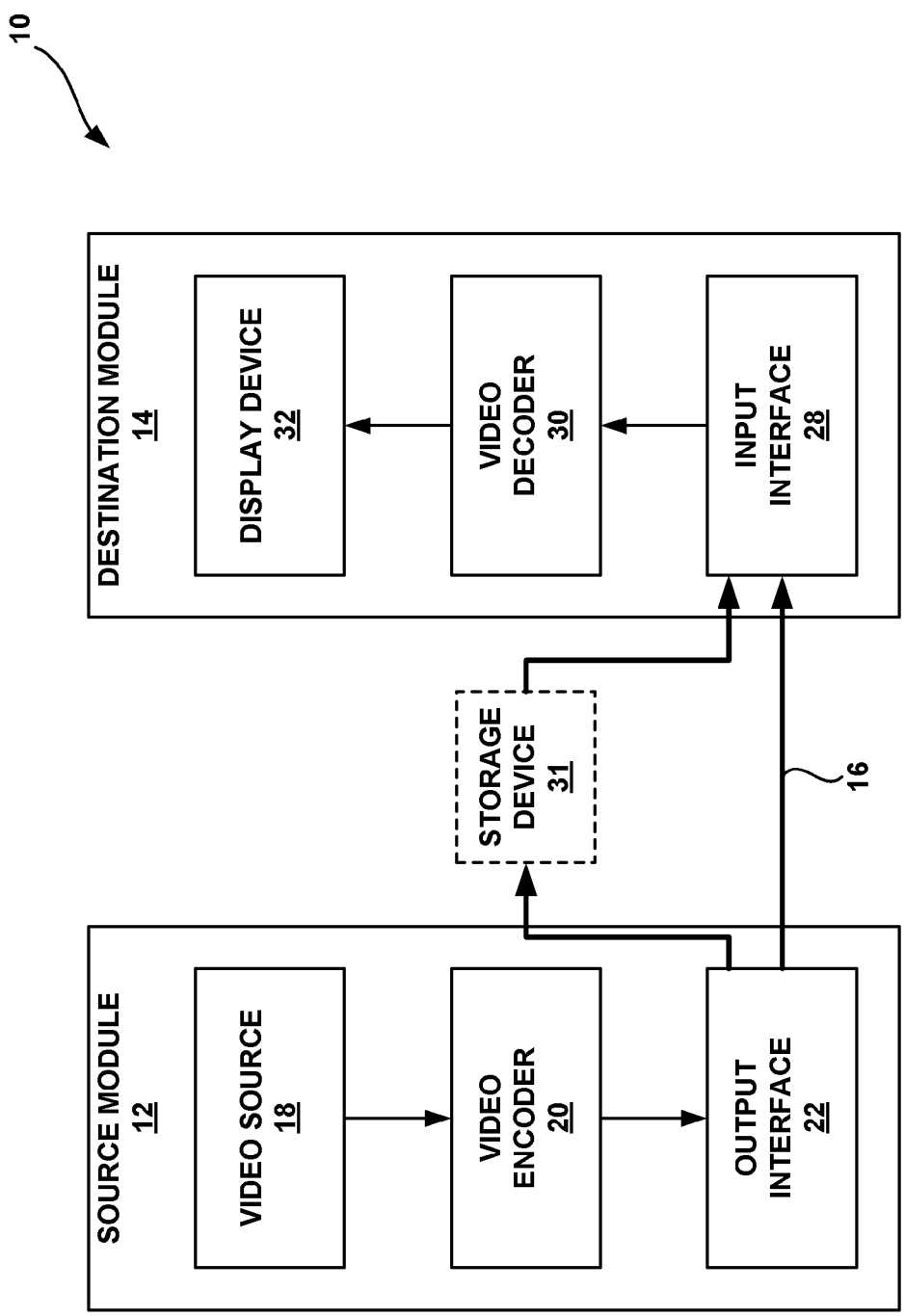
FIG. 1A is a block diagram illustrating an example video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in multi-layer video coding.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

For purposes of illustration only, certain embodiments disclosed herein are described with examples including only two layers (e.g., a lower layer such as the base layer, and a higher layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264, including its SVC and MVC extensions.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Video Coding System

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
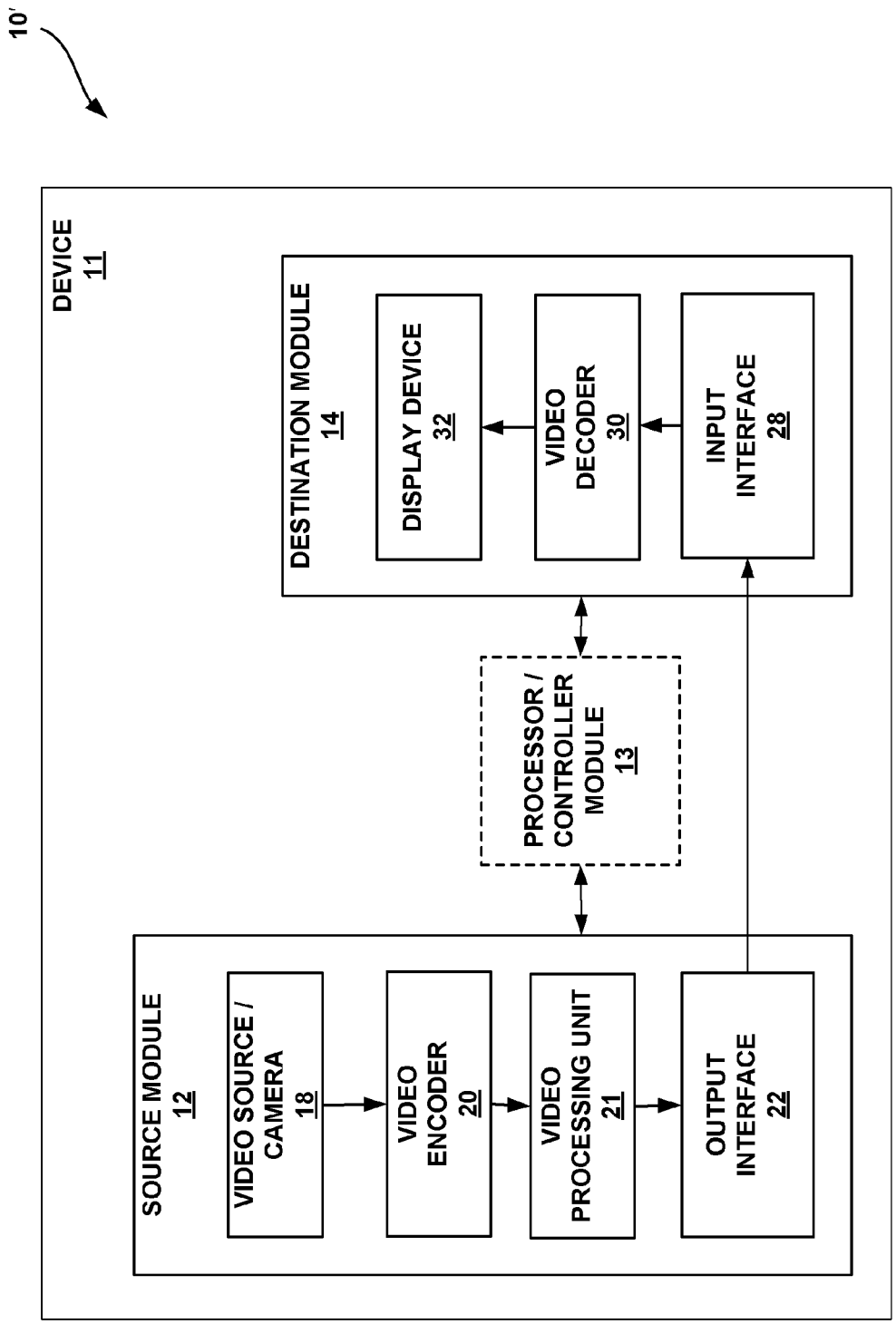
FIG. 1B is a block diagram illustrating another example video encoding and decoding system that may perform techniques in accordance with aspects described in this disclosure.

As shown in FIG. 1A, video coding system 10 includes a source module 12 that generates encoded video data to be decoded at a later time by a destination module 14. In the example of FIG. 1A, the source module 12 and destination module 14 are on separate devices—specifically, the source module 12 is part of a source device, and the destination module 14 is part of a destination device. It is noted, however, that the source and destination modules 12, 14 may be on or part of the same device, as shown in the example of FIG. 1B.

With reference once again, to FIG. 1A, the source module 12 and the destination module 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source module 12 and the destination module 14 may be equipped for wireless communication.

The destination module 14 may receive the encoded video data to be decoded via a link 16. The link 16 may comprise any type of medium or device capable of moving the encoded video data from the source module 12 to the destination module 14. In the example of FIG. 1A, the link 16 may comprise a communication medium to enable the source module 12 to transmit encoded video data directly to the destination module 14 in real-time. The encoded video data may be modulated according to a communication standard, such as a wireless communication protocol, and transmitted to the destination module 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source module 12 to the destination module 14.

Alternatively, encoded data may be output from an output interface 22 to an optional storage device 31. Similarly, encoded data may be accessed from the storage device 31 by an input interface 28. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source module 12. The destination module 14 may access stored video data from the storage device 31 via streaming or download. The file server may be any type of server capable of storing encoded video data and transmitting that encoded video data to the destination module 14. Example file servers include a web server (e.g., for a website), an FTP server, network attached storage (NAS) devices, or a local disk drive. The destination module 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source module 12 includes a video source 18, video encoder 20 and an output interface 22. In some cases, the output interface 22 may include a modulator/demodulator (modem) and/or a transmitter. In the source module 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source module 12 and the destination module 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted directly to the destination module 14 via the output interface 22 of the source module 12. The encoded video data may also (or alternatively) be stored onto the storage device 31 for later access by the destination module 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination module 14 includes an input interface 28, a video decoder 30, and a display device 32. In some cases, the input interface 28 may include a receiver and/or a modem. The input interface 28 of the destination module 14 may receive the encoded video data over the link 16. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination module 14. In some examples, the destination module 14 may include an integrated display device and also be configured to interface with an external display device. In other examples, the destination module 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination modules 12, 14 are on or part of a device or user device 11. The device 11 may be a telephone handset, such as a "smart" phone or the like. The device 11 may include an optional controller/processor module 13 in operative communication with the source and destination modules 12, 14. The system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller module 13. The system 10' of FIG. 1B, and components thereof, are otherwise similar to the system 10 of FIG. 1A, and components thereof.

Video encoder 20 and video decoder 30 may operate according to a video compression standard, such as the HEVC standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the examples of FIGS. 1A and 1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

Video Coding Process

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include a video parameter set (VPS), a sequence parameter set (SPS), a picture parameter set (PPS), an adaptation parameter set (APS), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more CUs. Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more PUs for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with TUs of the CU. Each TU of a CU may be associated with a different residual video block.

Video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
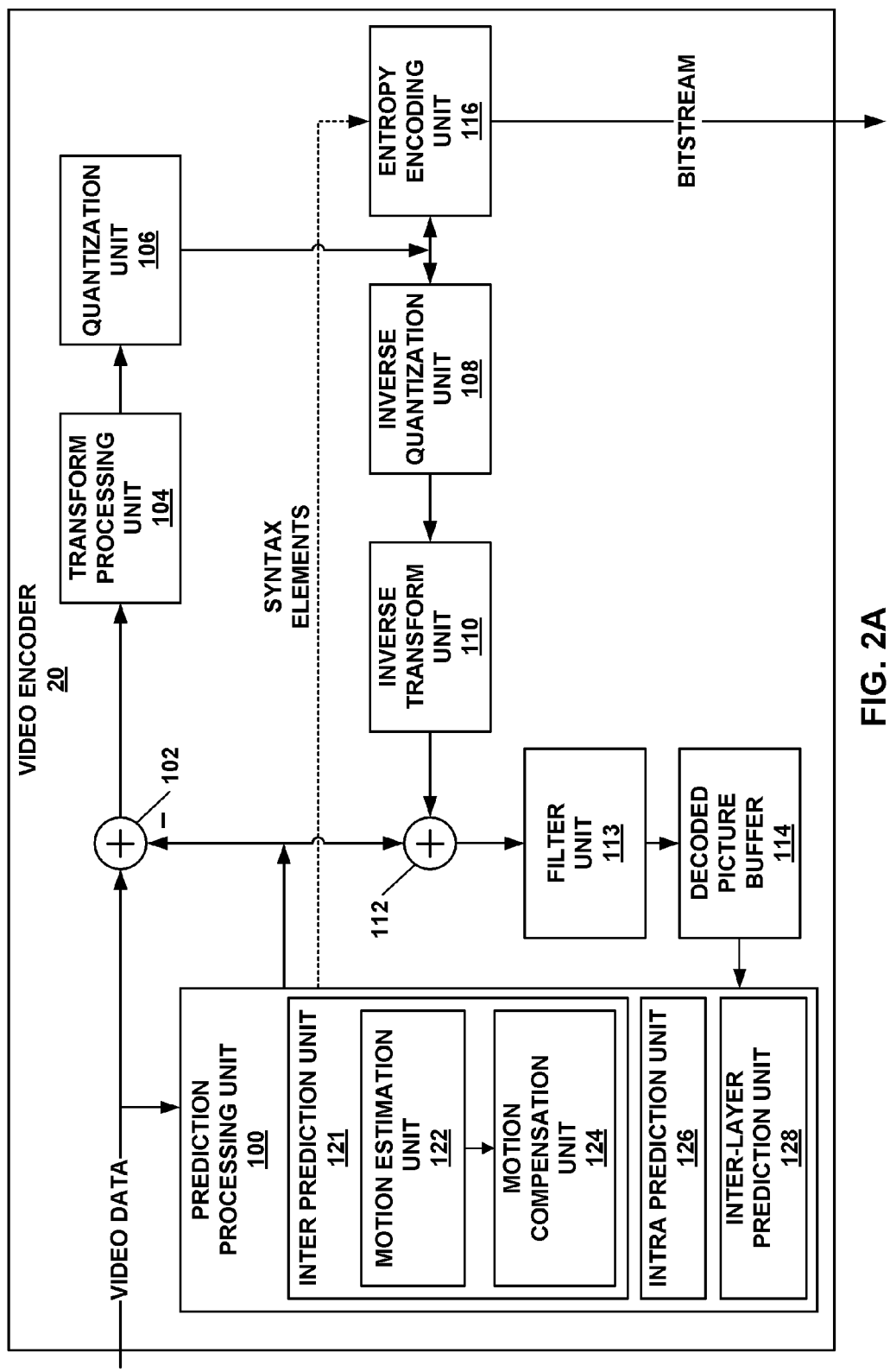
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (e.g., shown in FIG. 1A or 1B) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
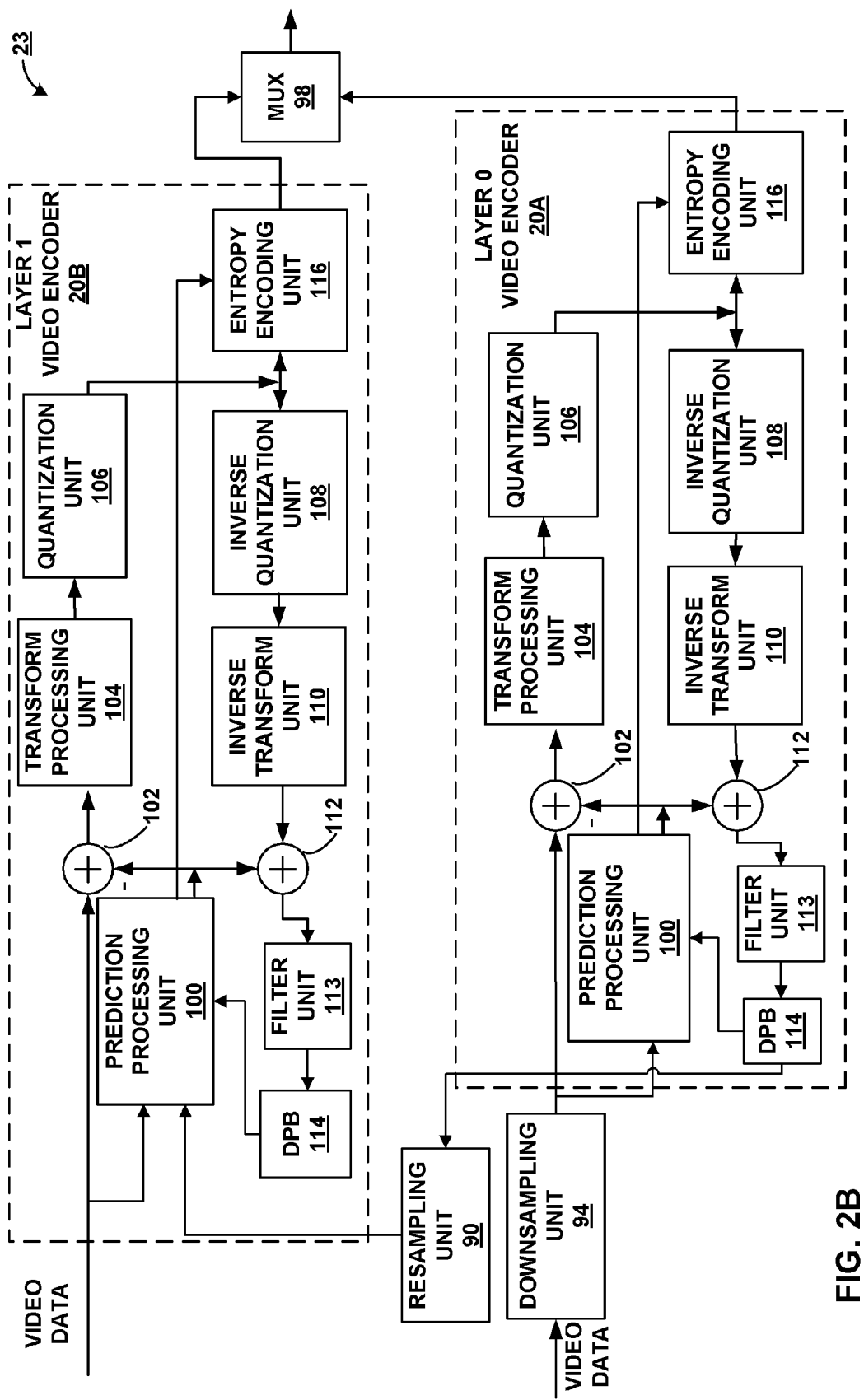
FIG. 2B is a block diagram illustrating an example of a video encoder that may implement techniques in accordance with aspects described in this disclosure.

FIG. 2B is a block diagram illustrating an example of a multi-layer video encoder 23 that may implement techniques in accordance with aspects described in this disclosure. The video encoder 23 may be configured to process multi-layer video frames, such as for SHVC and multiview coding. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include a resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may up sample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor 98, or mux. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source module 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
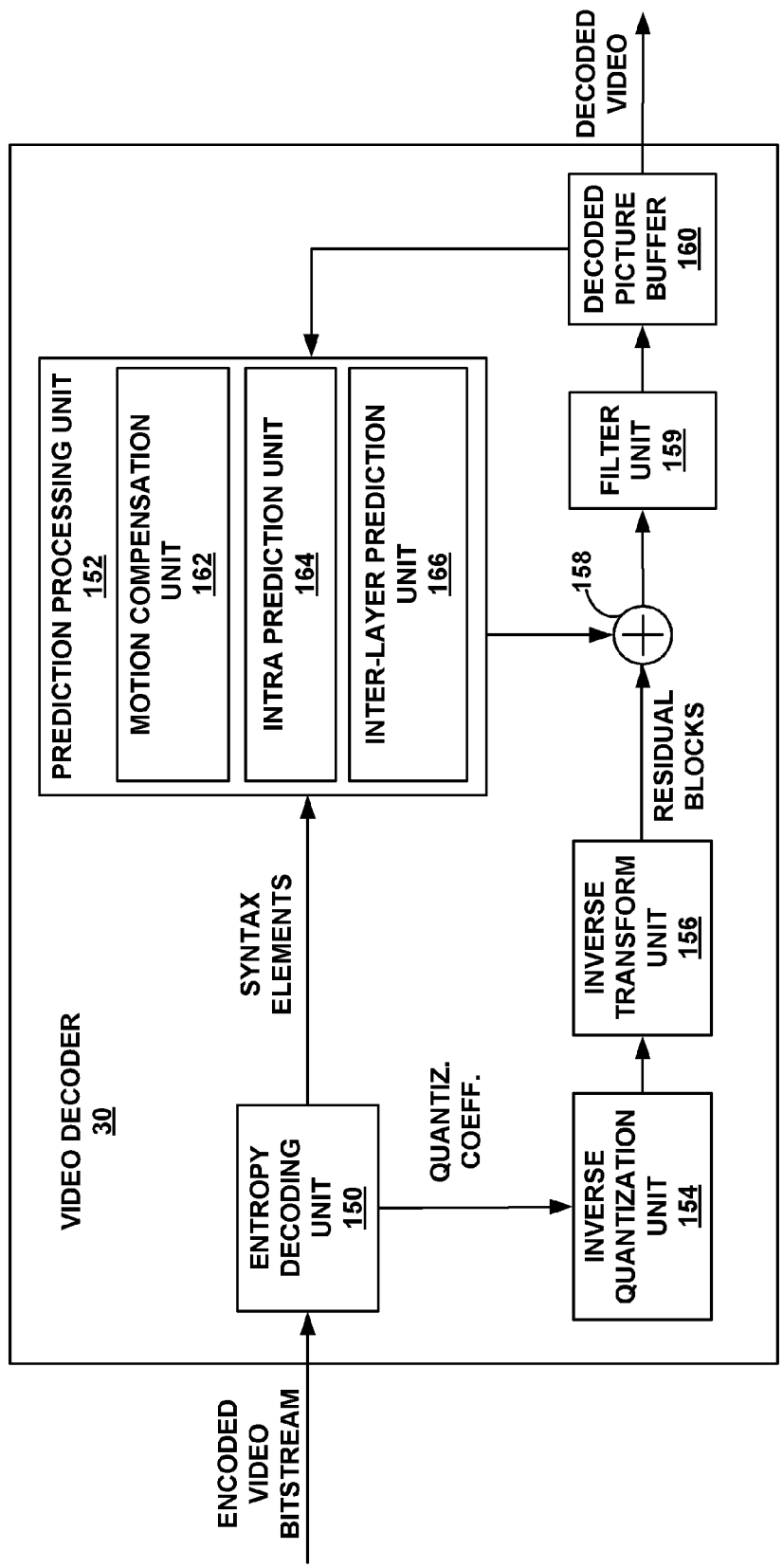
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. The video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, video decoder 30 may perform, based on the video blocks in decoded picture buffer 160, intra prediction or inter prediction operations on PUs of other CUs.

Multi-Layer Decoder

Figure 3B:
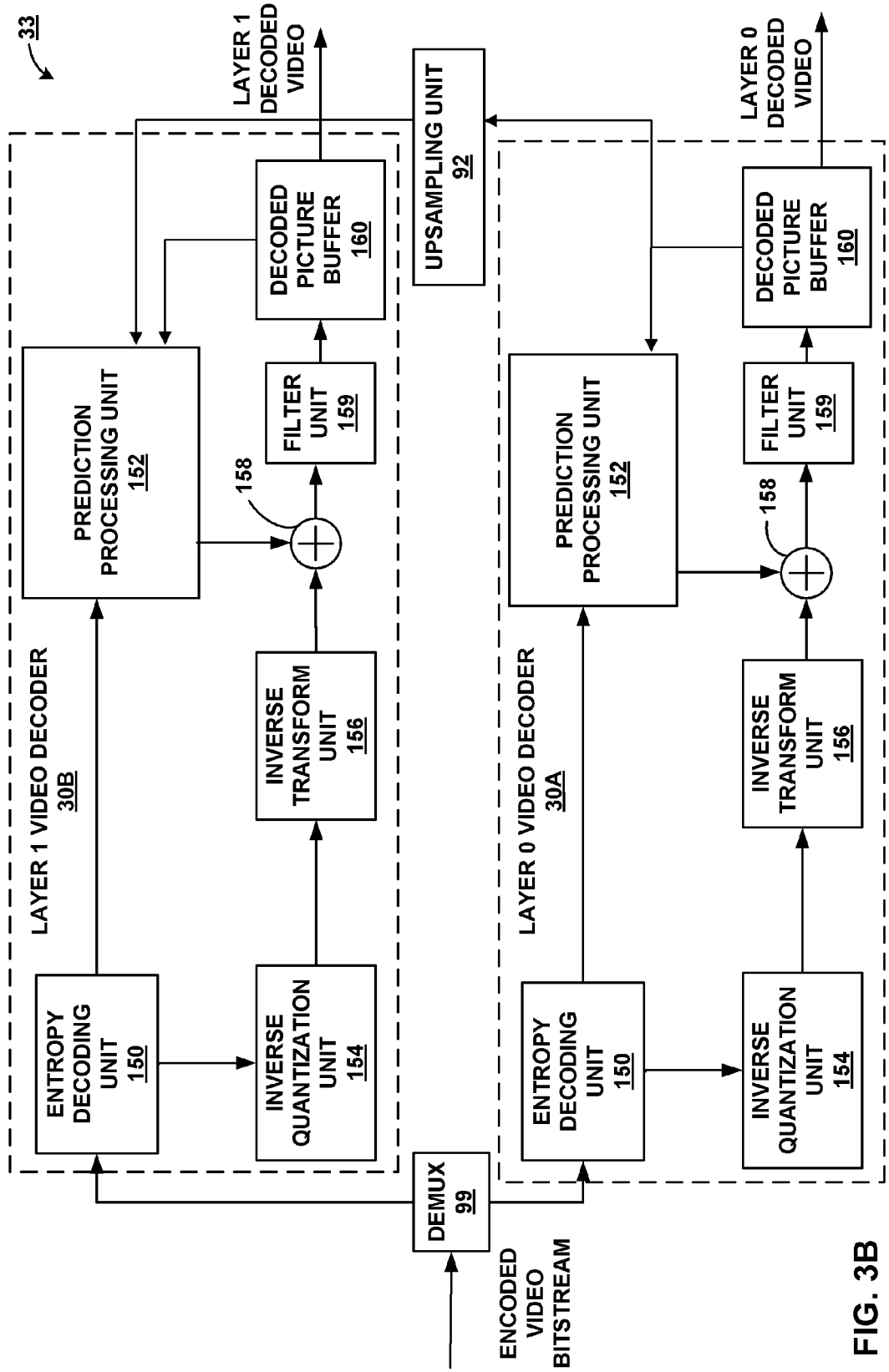
FIG. 3B is a block diagram illustrating an example of a video decoder that may implement techniques in accordance with aspects described in this disclosure.

FIG. 3B is a block diagram illustrating an example of a multi-layer video decoder 33 that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame.

The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexer 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination module 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, all pictures that follow a random access point in output order (e.g., including those pictures that are in the same access unit as the picture providing the random access point) can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as intra random access point (TRAP) pictures. For example, a random access point (e.g., provided by an enhancement layer IRAP picture) in an enhancement layer ("layerA") contained in an access unit ("auA") may provide layer-specific random access such that for each reference layer ("layerB") of layerA (e.g., a reference layer being a layer that is used to predict layerA) having a random access point contained in an access unit ("auB") that is in layerB and precedes auA in decoding order (or a random access point contained in auA), the pictures in layerA that follow auB in output order (including those pictures located in auB), are correctly decodable without needing to decode any pictures in layerA that precede auB.

IRAP pictures may be coded using intra prediction (e.g., coded without referring to other pictures) and/or inter-layer prediction, and may include, for example, instantaneous decoder refresh (IDR) pictures, clean random access (CRA) pictures, and broken link access (BLA) pictures. When there is an IDR picture in the bitstream, all the pictures that precede the IDR picture in decoding order are not used for prediction by pictures that follow the IDR picture. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as random access skipped leading (RASL) pictures. Another type of picture that can follow an TRAP picture in decoding order and precede it in output order is a random access decodable leading (RADL) picture, which may not contain references to any pictures that precede the TRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., having a layer ID of 0) that is an TRAP picture may be referred to as an TRAP access unit. The layer ID of a layer, such as the base layer, may be contained in a nuh_layer_id value. In some aspects, the base layer may have a layer ID of 0.

Direct Dependency Flag

In some example implementations (e.g., MV-HEVC and SHVC), there is a syntax element called direct_dependency_flag that specifies, for a particular layer, which layer or layers can be used for inter-layer prediction of the particular layer. In one embodiment, the direct_dependency_flag is a two-dimensional array that specifies whether one layer of video data is coded based on (or dependent on) another layer of video data. Such a two-dimensional array may take a form of values direct_dependency_flag[i][j], where i corresponds to the layer to be coded (e.g., current layer) and j corresponds to the layer to be referenced (e.g., reference layer). In this example, direct_dependency_flag may be 0 if the reference layer is not a direct reference layer of the current layer, and direct_dependency_flag may be 1 if the reference layer is a direct reference layer of the current layer. In one embodiment, if direct_dependency_flag is omitted or undefined, the value is inferred to be 0. In another embodiment, if direct_dependency_flag is omitted or undefined, the value is inferred to be 1. In one embodiment, if Layer A is a direct reference layer of Layer B, it means that Layer B can be coded based at least in part on information included in Layer A. In another embodiment, if Layer A is a direct reference layer of Layer B, it means that Layer B is coded based at least in part on information included in Layer A. In some embodiments, all the layers that have a smaller layer ID (e.g., lower layer) are direct reference layers of a particular layer. In other embodiments, only some of the lower layers may be direct reference layers of a particular layer. For example, the encoder may choose only some of the lower layers as direct dependency layers of a particular layer to reduce computational complexity. The applicable coding scheme (e.g., HEVC) may have a limit as to how many direct reference layers a particular layer may have (e.g., no more than one reference layer for spatial scalability). In one embodiment, the direct_dependency_flag flag is signaled in the video parameter set (VPS) and applies to the entire coded video sequence (CVS).

Direct Dependency Type

The information that is used to code the current layer may include texture information (e.g., pixel values) of the reference layer, motion information (e.g., motion vectors, reference indices, prediction direction, etc.) of the reference layer. However, the information of the reference layer that may be used to code the current layer is not limited to those discussed herein, but can be any information that is included in or part of the reference layer.

In some implementations, one or more additional flags or syntax elements may be used to indicate the type or types of information that are derived or imported from the reference layer to code the current layer. For example, in some embodiments, the reference layer may be used for inter-layer motion prediction, inter-layer texture prediction, or both. In one embodiment, such a flag or syntax element may be called "direct_dependency_type."

In one embodiment, the direct_dependency_type is a two-dimensional array that specifies which type of inter-layer prediction is used for coding the current layer using the reference layer. Such a two-dimensional array may take a form of values direct_dependency_type[i][j], where i corresponds to the current (e.g., layer to be coded) and j corresponds to the reference layer (e.g., layer to be referenced). In this example, a direct_dependency_type value of 0 may indicate inter-layer sample prediction only, 1 may indicate inter-layer motion prediction only, and 2 may indicate both inter-layer sample and motion prediction. In some embodiments, a direct_dependency_type value of 3 (or any other value) may indicate that there is no dependency. How each direct_dependency_type value is assigned or mapped to different types of inter-layer prediction may be different in other implementations, and the present disclosure is not limited to any particular assignment or mapping of direct_dependency_type values to different types of inter-layer prediction. In one embodiment, the direct_dependency_type syntax element is signaled in the video parameter set (VPS) and applies to the entire coded video sequence (CVS).

Reference Layer Codec

In some existing coding schemes, a reference or base layer codec may be any number of codecs. For example, an HEVC codec may be used for the reference layer or an H.264/AVC may be used, or a general, non-HEVC codec. In addition, there may be a flag in a parameter set indicating the codec to be used. For example, a flag in the video parameter set (VPS) may indicate whether HEVC or non-HEVC (e.g., AVC) codec is used to code the reference layer. In one example, a flag avc_base_layer_flag may have a value equal to 1, indicating that the reference layer codec conforms to the video coding standard according to Recommendation ITU-T H.264|International Standard ISO/IEC 14496-10, and alternatively, may have a value equal to 0, indicating that the reference layer codec conforms to the HEVC specification. Therefore, a coding device configured to encode or decode an enhancement layer may have information regarding whether an AVC or HEVC codec (or some other non-HEVC codec) is used with respect to the reference layer.

For example, in some aspects, a non-HEVC codec may be used for a reference or base layer, and one or more enhancement layers may be based on an H.265/HEVC coding standards and its multi-layer extensions. For example, these enhancement layers may be based the Scalable extension of H.265/HEVC (SHVC). Using such a configuration may have a number of advantages. For example, this may allow devices which are compatible only with non-HEVC codecs to decode the video without the enhancement layers, and further allow devices that are compatible with HEVC codecs to decode the video and the enhancement layers.

Support for SHVC-Based Enhancement Layers

Certain designs may allow for support of a H.264/AVC (or other non-HEVC) base layer, with SHVC-based enhancement layers. Accordingly, two or more decoders may be used to decode a video using these techniques. For example, one decoder may decode the non-HEVC base layer as is known in the art. Another decoder, such as an HEVC decoder, may be used to decode the one or more SHVC-based enhancement layers. In some aspects, it may be beneficial to provide a design for the enhancement layers which may allow the HEVC decoder to decode these layers when a non-HEVC base layer is used. From the point of view of the HEVC decoder, these base layers may be decoded by an external source or an external means. Accordingly, the HEVC decoder may not receive any information from the base layer, or may only receive a limited subset of information from the base layer, such as the image information for each frame from the base layer.

When decoding an HEVC-based enhancement layer in a video that includes a non-HEVC-based base layer, no base layer picture information may be provided to the enhancement layer. Alternatively, the external source (such as a base layer decoder) may provide a proscribed set of information to the decoder, including the decoded sample values of the base layer decoded picture, the representation format of the base layer decoded picture, including the width and height in luma samples, the color format, the luma bit depth, and the chroma bit depth, and an indication whether the base layer picture is an IDR picture or not. Optionally, information also be provided on whether the picture is a frame or a field, and when a field, the field parity (indicating whether the field is a top field or a bottom field). If this information is not provided, the decoded picture may be inferred to be a frame picture.

Outputting a base layer picture may be the responsibility of a base layer decoder. For example, this decoder may be an H.264/AVC decoder, or a decoder of another non-HEVC codec. Output synchronization between the base layer picture and an enhancement layer picture in the same access unit may be externally controlled. For example, one method of external control may be to use presentation timestamps. In some aspects, the association of a base layer decoded picture to an access unit may be the responsibility of the external source/source, such as the base layer decoder or another source that is external to the enhancement layer decoder.

In some aspects, an SHVC decoder, which is used to decode one or more enhancement layer, may only need to keep one decoded picture store of memory for a base layer decoded picture, and this memory may not considered as part of the decoded picture buffer (DPB).

The non-HEVC base layer decoded picture may have a layer ID (nuh_layer_id value) of 0. In some aspects, a HevcBaseLayerFlag value may be used to indicate whether or not the base layer is an HEVC base layer. When the base layer is not an HEVC base layer, this flag may have a value of 0, while this flag may have a value of 1 when the base layer is an HEVC layer.

In some aspects, the picture order count of the base layer decoded picture is set equal to the picture order count of the enhancement layer pictures. Note that in this case the actual picture order count of a base layer picture decoded by the base layer decoder in such a scalable or multiview codec might be different than the picture order count value of the same picture when it is decoded by an AVC decoder.

In some aspects, the base layer decoded picture may be marked as "used for long-term reference." For the coded picture buffer operations of the hypothetical reference decoder or buffering model, the base layer may be considered as having zero bits. For decoded picture buffer operations of the hypothetical reference decoder or buffering model, only decoded pictures of enhancement layers may be considered.

Identified Issues with Support for SHVC-Based Enhancement Layers

As described above, SHVC-based enhancement layers may be used with a base layer that used a non-HEVC codec, such as an H.264/AVC codec. However, these SHVC-based enhancement layers may encounter certain problems, due to the combination of the SHVC-based enhancement layers and the non-HEVC base layer. Certain issues may not arise when using an HEVC base layer, but only when using a non-HEVC base layer, such as when a decoded picture is provided to the SHVC coder by an external source, such as an AVC coder.

In some aspects, when the base layer is a non-HEVC layer, signaling of certain parameters may be done in a manner which limits the amount of bits used for such signaling. For example, it may be advantageous to use a limited amount of bits for certain DPB parameters, such as those which assign a sub-DPB size, a maximum reorder and a maximum latency. Further, it may be advantageous if certain syntax structures do not apply to the base layer (layer 0) when the base layer is a non-HVEC layer.

For example, signaling of certain parameters may be unnecessary or redundant when using a non-HEVC base layer. Certain parameters may be inferred simply from the presence of the non-HEVC base layer, and thus, any further signaling of those parameters may be unnecessary. Thus, in order to efficiently use memory and other resources, a coder may be configured to determine whether or not a base layer is coded using an HEVC codec, and to choose whether or not to signal certain parameters based, at least in part, on the codec used for a base layer of a video stream. When the base layer is a non-HEVC base layer, a coder may be configured to infer certain values of these parameters, rather than have those values explicitly defined.

In some aspects, a base layer decoded picture may be provided by the external means or external source. It may be advantageous if this picture is stored in a sub-DPB for the base layer. The size of this sub-DPB may be set to 1, and the sub-DPB may be emptied at the end of the decoding process for each access unit.

It may also be advantageous if the base layer decoder (which may be referred to as an external source, because it is external to the SHVC-decoder) provides certain values to the SHVC-decoder, which contain information about the base layer. For example, the external source may provide a decoded base layer picture, and may also provide an indication of whether or not the base layer picture is an IRAP picture. If the base layer picture is an IRAP picture, the external source may be further required to provide the coder with an IRAP NAL unit type, which specifies whether the picture is an IDR picture, a CRA picture, or a BLA picture.

Efficient Signaling of DPB Parameters

In some aspects, certain signaling of DPB parameters may be inefficient when using a non-HEVC base layer and one or more SVHC-based enhancement layer. For example, certain parameters may have constrained values when a base layer is a non-HEVC base layer. For example, a given parameter may have a single, particular value whenever the base layer is a non-HEVC layer. Accordingly, signaling these values for each element in an array (or other data structure) may be redundant, as these values may be inferred based upon an indicating that the base layer is a non-HEVC layer, or inferred base upon other information.

For example, one DPB parameter that may be signaled is vps_max_dec_pic_buffering_minus1[i]. The value of this array, plus 1, signals the maximum required size of the decoded picture buffer for the highest temporal sub-layer to be decoded. However, when using a non-HEVC base layer, vps_max_dec_pic_buffering_minus1[i] will be for all possible values of i. Accordingly, since the value of vps_max_dec_pic_buffering_minus1[i] is constrained when using a non-HEVC base layer, it may be desirable to avoid signaling these values.

For example, when a non-HEVC base layer is present, the value of HevcBaseLayerFlag may be set to 0, and the value of AvcBaseLayerFlag may be set to 1. Accordingly, the coder may be configured to check one or more of these values prior to setting a value for vps_max_dec_pic_buffering_minus1[i]. When the coder determines that a non-HEVC base layer is present, the coder may then refrain from setting values for vps_max_dec_pic_buffering_minus1[i] for each value of i, as this value may be inferred from other information, such as an indication that the base layer is coded using a non-HEVC codec.

In some aspects, the coder may be configured to set each value of vps_max_dec_pic_buffering_minus1[i] to 0, for each possible i, when the coder determines that a non-HEVC base layer is present. For example, this value or another value may use the least amount of bits possible to signal vps_max_dec_pic_buffering_minus1[i]. It may be beneficial to use the least amount of bits possible to signal values of vps_max_dec_pic_buffering_minus1[i], when values of the array are constrained due to the use of a non-HEVC base layer. Accordingly, values for vps_max_dec_pic_buffering_minus1[i] may be set to 0 for all values of i. When decoding, a decoder may be configured to ignore these values as the values may be constrained based upon the use of the non-HEVC base layer.

Further, the vps_sub_layer_ordering_info_present_flag may be present and set to 1 when a non-HEVC base layer is used. A value of 1 may indicate that vps_max_dec_pic_buffering_minus1[i], vps_max_num_reorder_pics[i], and vps_max_latency_increase_plus1[i] are present for the i sublayers, while a value of 0 may indicate that values of vps_max_dec_pic_buffering_minus1[vps_max_sub_layers_minus1], vps_max_num_reorder_pics[vps_max_sub_layers_minus1], and vps_max_latency_increase_plus1[vps_max_sub_layers_minus1] apply to all sub-layers (such that each of these arrays has the same value for each of the i sublayers).

Another DPB parameter that may be signaled is vps_max_num_reorder_pics[i], which indicates a maximum amount of reordering that can occur between pictures to be outputted. For example, certain pictures that are to be outputted may precede another picture to be outputted in the coding order, but may follow that same picture in the output order. The maximum reordering value (vps_max_num_reorder_pics[i]) indicates, for a value of HighestTid equal to i, a maximum allowed number of pictures that are set to be outputted which may proceed a given output picture in the decoding order, but follow that same picture in the output order.

As with vps_max_dec_pic_buffering_minus1[i], when the base layer is a non-HEVC layer, vps_max_num_reorder_pics[i] may be set to 0 for all values of i. Accordingly, it may be advantageous for the coder to not signal the values of vps_max_num_reorder_pics[i], after the coder has determined that the base layer is a non-HEVC base layer. When this value is not signaled, values of vps_max_num_reorder_pics[i] may be inferred, based upon an indication that the base layer is a non-HEVC layer. In some aspects, the coder may be configured to set each value of vps_max_num_reorder_pics[i] to 0, for each possible i, when the coder determines that a non-HEVC base layer is present.

In some aspects, the coder may be configured to set each value of vps_max_num_reorder_pics[i] to 0, for each possible i, when the coder determines that a non-HEVC base layer is present. For example, this value or another value may use the least amount of bits possible to signal vps_max_num_reorder_pics[i]. It may be beneficial to use the least amount of bits possible to signal values of vps_max_num_reorder_pics[i], when values of the array are constrained due to the use of a non-HEVC base layer. Accordingly, values for vps_max_num_reorder_pics[i] may be set to 0 for all values of i. When decoding, a decoder may be configured to ignore these values as the values may be constrained based upon the use of the non-HEVC base layer.

Another DPB parameter that may be signaled is vps_max_latency_increase_plus1[i]. A value of this parameter not equal to 0 may be used to compute a maximum number of output pictures that can precede an output picture with in the video stream in output order and follow that output picture in decoding order when the highest temporal sub-layer to be decoded is equal to i.

As above, when the base layer is a non-HEVC layer, vps_max_latency_increase_plus1[i] may be set to 0 for all values of i. Accordingly, it may be advantageous for the coder to not signal the values of vps_max_latency_increase_plus1[i], after the coder has determined that the base layer is a non-HEVC base layer. When this value is not signaled, values of vps_max_latency_increase_plus1[i] may be inferred, based upon an indication that the base layer is a non-HEVC layer. In some aspects, the coder may be configured to set each value of vps_max_latency_increase_plus1[i] to 0, for each possible i, when the coder determines that a non-HEVC base layer is present.

In some aspects, the coder may be configured to set each value of vps_max_latency_increase_plus1[i] to 0, for each possible i, when the coder determines that a non-HEVC base layer is present. For example, this value or another value may use the least amount of bits possible to signal vps_max_latency_increase_plus1[i]. It may be beneficial to use the least amount of bits possible to signal values of vps_max_latency_increase_plus1 [i], when values of the array are constrained due to the use of a non-HEVC base layer. Accordingly, values for vps_max_latency_increase_plus1 [i] may be set to 0 for all values of i. When decoding, a decoder may be configured to ignore these values as the values may be constrained based upon the use of the non-HEVC base layer.

Accordingly, as described above, it may be advantageous for a coder to use the least amount of bits possible to signal vps_max_dec_pic_buffering_minus1[i], vps_max_num_reorder_pics[i], and vps_max_latency_increase_plus1 [i]. For example, if the values of each of these arrays are constrained when a non-HEVC base layer is used, it may be advantageous to signal these values using fewer bits than would be needed in situations where the values are not constrained. For example, the values for each of these arrays may be set to 0 for all values of i. A decoder may then be configured to ignore these values. For example, a decoder may be configured to determine whether or not a base layer is an HEVC base layer, such as by checking a flag. If the base layer is a non-HEVC base layer, the decoder may be configured to ignore the values of each of vps_max_dec_pic_buffering_minus1[i], vps_max_num_reorder_pics[i], and vps_max_latency_increase_plus1 [i].

In some aspects, hrd_layer_set_idx[i] may be used to specify the layer set to which the i-th hrd_parameters( ) syntax structure in the VPS applies. In previous versions of video streams, it may have been specified that hrd_layer_set_idx[i] may be equal to 0. Accordingly, it may be beneficial for hrd_layer_set_idx[i] to be greater than 0, such that a decoder may be aware that the video stream is a video stream which has a non-HEVC base layer, rather than adhering to prior standards. Further, in some aspects, none of the hrd_parameters( ) syntax structures may apply to the non-HEVC base layer, which has a layer ID of 0. For example, when the base layer is signaled to be non-HEVC or externally-provided, there should be no HRD parameters applicable to the base layer, as the base layer is not in the bitstream.

Example Flowchart #1

Figure 4:
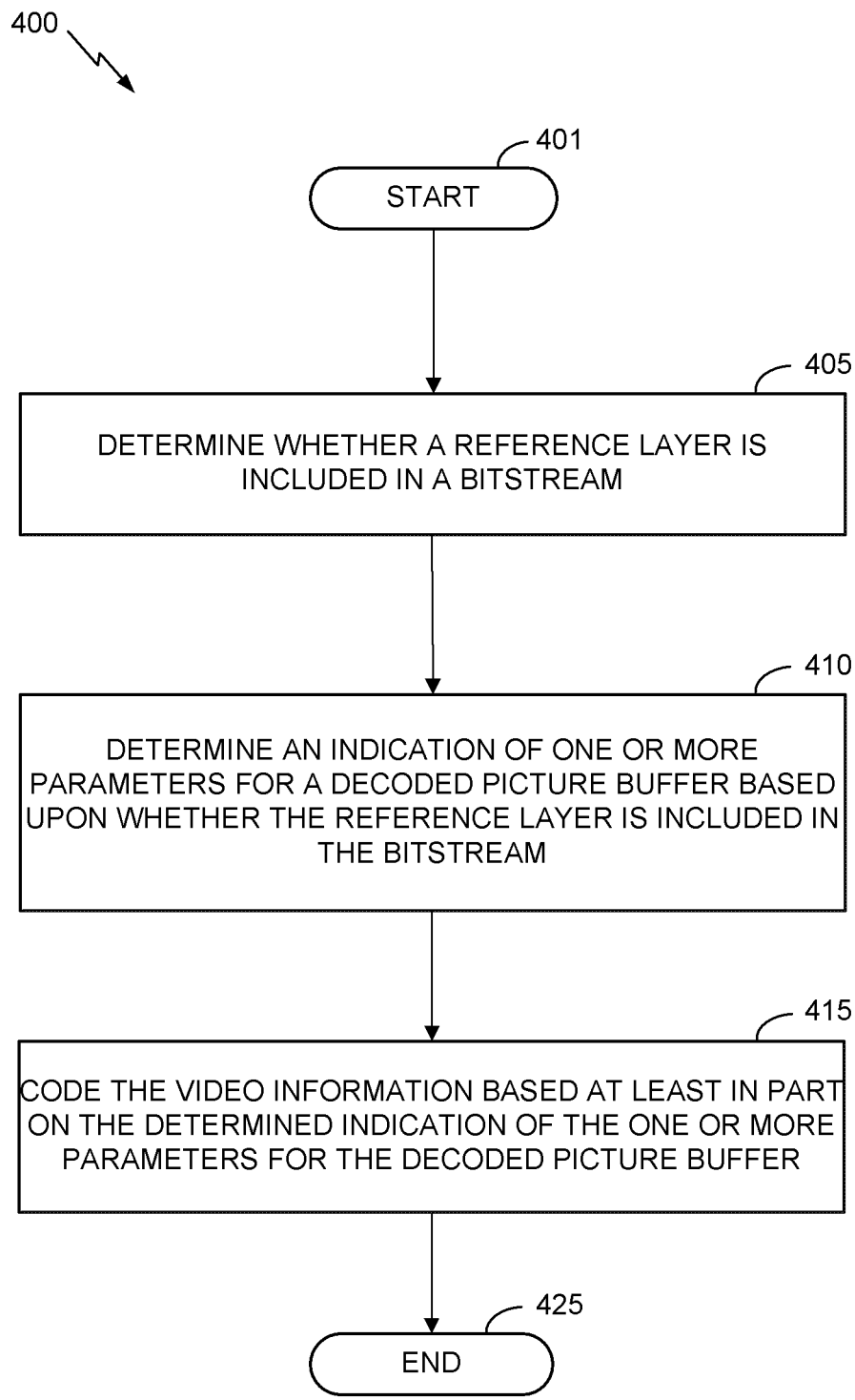
FIG. 4 illustrates a flow chart illustrating a method of coding video information, according to one embodiment of the present disclosure.

FIG. 4 is a flowchart illustrating a method 400 for coding video information, according to an embodiment of the present disclosure. The steps illustrated in FIG. 4 may be performed by an encoder (e.g., the video encoder as shown in FIG. 2A or FIG. 2B), a decoder (e.g., the video decoder as shown in FIG. 3A or FIG. 3B), or any other component. For convenience, method 400 is described as performed by a coder, which may be the encoder, the decoder, or another component. The method may be a method of decoding, or a method of encoding.

The method 400 begins at block 401. In block 405, the coder determines whether a reference layer is included in a bitstream. For example, the reference layer may not be included in the bitstream when the reference layer is a non-HEVC codec. Accordingly, in some aspects, the reference layer may be coded in a non-HEVC codec, or may be coded in an AVC codec, and therefore may not be included in the bitstream. In some aspects, the method determines whether the reference layer is included in the bitstream based upon a value of a flag or a variable. Such a flag or other indicator may be received from the external source, or may be determined by the method. In some aspects, the means for determining may include a processor.

Next, at block 410, the coder determines an indication of one or more parameters for a decoded picture buffer based upon whether the reference layer is included in the bitstream. For example the one or more parameters for a decoded picture buffer may include a parameter which signals the maximum required size of the DPB, such as a maximum size of a sub-DPB. Generally, if the reference layer is not included in the bitstream, the values for the these parameters may be known, as described above. In some aspects, determining an indication for the maximum size of the sub-DPB may include determining an indication for the maximum size of the sub-DPB which indicates that the maximum size of the sub-DPB is 1. In some aspects, the means for determining may include a processor. In the video encoding process, the coder may include one or more syntax structures into the bitstream that include the indication of the one or more parameters. In the video decoding process, determining the indication may include decoding one or more syntax structures from the bitstream. Details of example syntax structures are described herein.

In some aspects, the parameter may also include a value which signals a maximum number of reordering of output pictures, or a maximum latency. In some aspects, certain parameters may be determined based, at least in part, on the codec used for the base layer. For example, in some aspects, the values of one or more parameters may be set to 0, for all possible values of i, when the base layer is a non-HVEC codec. At block 415, the coder codes the video information based at least in part on the determined indication of the one or more parameters for the decoded picture buffer. In some aspects, the means for coding may include a processor. The method 400 ends at block 425.

As discussed above, one or more components of video encoder 20 of FIG. 2A, video encoder 21 of FIG. 2B, video decoder 30 of FIG. 3A, or video decoder 31 of FIG. 3B (e.g., inter-layer prediction unit 128 and/or inter-layer prediction unit 166) may be used to implement any of the techniques discussed in the present disclosure, such as determining whether the reference layer codec is the particular type of codec, receiving the decoded base layer picture, storing the decoded base layer picture, and emptying the memory.

Reducing Unnecessary Signaling in the VPS Extension when Using a Non-HEVC Base Layer In some aspects, when the base layer is a non-HEVC base layer, it may be desirable to avoid unnecessary signalling for the base layer in the VPS extension, including VPS video usability information (VUI) metadata. For example, the VPS VUI may include a number of values that may be inferred simply based on the knowledge that the base layer is encoded using a non-HEVC codec, and thus, it may be unnecessary to continue to signal this redundant information in the video.

For example, certain values in the VPS VUI may be determined solely based on the knowledge that the base layer is a non-HEVC base layer. Accordingly, if it is signaled that the base layer is a non-HEVC base layer, further signaling on certain values in the VPS VUI may be redundant and unnecessary. As described above, if the value of a HevcBaseLayerFlag is set to 0, this may signal that the base layer is not an HEVC layer. Accordingly, other signaling may be avoided as redundant and unnecessary.

As described above, direct_dependency_type[i][j] indicates a type of dependency between the layer i and layer j. For example, a value of 0 indicates that layer j may be used for both inter-layer sample prediction and inter-layer motion prediction for layer i. A value of 1 indicates that layer j may be used for inter-layer sample prediction but not for inter-layer motion prediction for layer i. A value of 2 indicates that layer j may be used for inter-layer motion prediction but not for inter-layer sample prediction for layer i.

When using a base layer that is non-HEVC, inter-layer motion prediction from the base layer may be disallowed for all other layers. As described above the non-HEVC base layer has a layer ID of 0. Further, when inter-layer motion prediction is not allowed, this may correspond with a direct_dependency_type value of 1. Thus, the value of direct_dependency_type[i][0] may be inferred to be 1 for all values of i, because no layer may use the base layer (with layer ID of 0) for inter-layer motion prediction. These values need not be explicitly signaled, as such signaling may be redundant after an indication that the base layer is a non-HEVC base layer.

For example, a coder, either an encoder or a decoder, may recognize that the base layer is a non-HEVC base layer. Based upon this recognition (which may be recognized, for example, based upon one or more indication such as a flag), the coder may be configured to infer values of direct_dependency_type[i][0] for all values of i, such that the inferred values may be 1 for all values of i.

In some aspects, the following code segment may be used to avoid unnecessary signaling in the VPS extension. This code segment may avoid signaling values for direct_dependency_type[i][0] since, as described above, those values may be inferred based upon the indication that the base layer is not an HEVC layer:

| | Descriptor |
|---|---|
| vps_extension( ) {<br>...<br>  if( default_direct_dependency_flag )<br>    default_direct_dependency_type<br>  else {<br>    for( i = HevcBaseLayerFlag ? 1 : 2; i <=<br>    MaxLayersMinus1; i++ )<br>      for( j = HevcBaseLayerFlag ? 0 : 1; j < i; j++ )<br>        if( direct_dependency_flag[ i ][ j ] )<br>          direct_dependency_type[ i ][ j ]<br>} | <br><br>u(v)<br><br><br><br><br><br>u(v) |

Other values in the VPS VUI may also be unnecessary or redundant after it has been signaled that the base layer is a non-HEVC layer. For example, the value of sub_layers_vps_max_minus1[0] may also be inferred based on the presence of a non-HEVC base layer.

For example, sub_layers_vps_max_minus1[i] plus 1 specifies the maximum number of temporal sub-layers that may be present in the coded video sequence for layer i. As before, the layer ID of the base layer is 0. Because the base layer is decoded by external source and not by the decoder (that is, the SHVC decoder), the base layer will not contain any sub-layers, and so it is unnecessary to signal a value for sub_layers_vps_max_minus1[0] for a non-HEVC base layer. Accordingly, a coder may be configured to infer this value based upon recognizing that the base layer is a non-HEVC base layer.

In some aspects, the following code segment from vps_extension( ) may be used to avoid signaling the value of sub_layers_vps_max_minus1[0], when the base layer is a non-HEVC base layer, since this value may be unnecessary:

| | Descriptor |
|---|---|
| vps_extension( ) {<br>...<br>  vps_sub_layers_max_minus1_present_flag<br>  if( vps_sub_layers_ max_minus1_present_flag )<br>    for( i = HevcBaseLayerFlag ? 0 : 1; i <=<br>    MaxLayersMinus1; i++ )<br>      sub_layers_vps_max_minus1[ i ] | <br><br>u(1)<br><br><br><br>u(3) |

Other values in the VPS VUI may also be unnecessary or redundant after it has been signaled that the base layer is a non-HEVC layer. For example, the value of max_tid_il_ref_pics_plus1[0][j] may also be inferred based on the presence of a non-HEVC base layer.

Generally, max_tid_il_ref_pics_plus1[i][j] may be used to determine whether or not a picture from layer i, with a given TemporalId, may be used for inter-layer prediction for a picture from layer j. A value equal to 0 indicates that non-TRAP pictures from layer i are not used for inter-layer prediction with layer j. A value greater than 0 indicates that pictures from layer i with TemporalId less than or equal to max_tid_il_ref_pics_plus1[i][j] may be used as reference for inter-layer prediction for pictures from layer j. When not present, max_tid_il_ref_pics_plus1[i][j] is inferred to be equal to 7.

However, when the base layer is a non-HEVC base layer and not present in the bitstream, the value of max_tid_il_ref_pics_plus1[0][j] (where the base layer is layer 0) that indicates whether or not a picture from layer 0, with a given TemporalId, may be used for inter-layer prediction for a picture from layer j becomes less useful. Thus, explicit signaling of this value may be unnecessary, and may be avoided.

In some aspects, the following code segment may be used in vps_extension( ) in order to avoid signaling values for max_tid_il_ref_pics_plus1[0][j] when the base layer is a non-HEVC base layer:

|  | Descriptor |
|---|---|
| vps_extension( ) { | |
| ... | |
|    max_tid_ref_present_flag | u(1) |
|    if( max_tid_ref_present_flag ) | |
|       for( i = HevcBaseLayerFlag ? 0 : 1; i < MaxLayersMinus1; i++ ) | |
|          for( j = i + 1; j <= MaxLayersMinus1; j++ ) | |
|             if( direct_dependency_flag[ j ][ i ] ) | |
|                max_tid_il_ref_pics_plus1[ i ][ j ] | u(3) |

Example Flowchart #2

Figure 5:
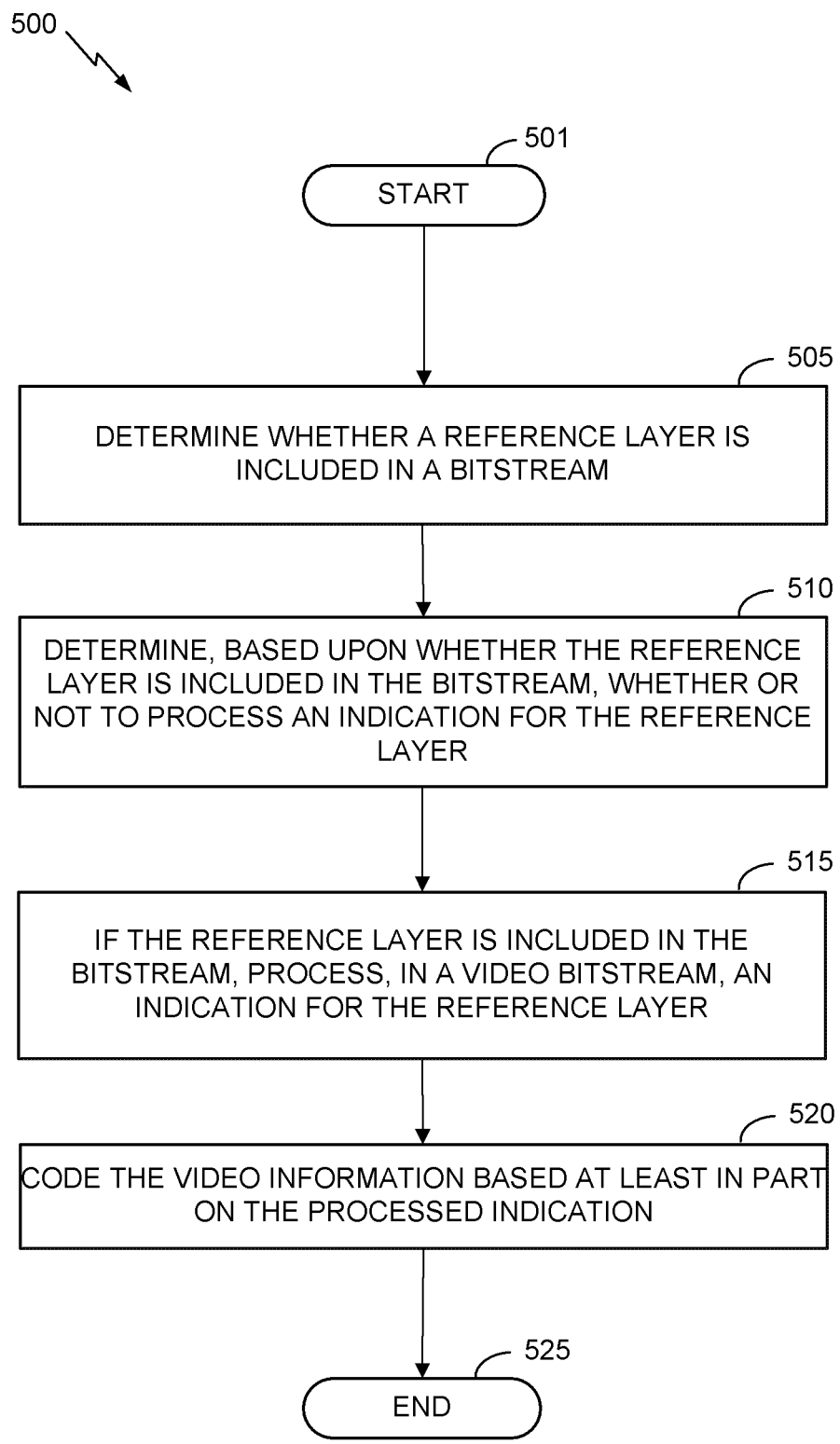
FIG. 5 illustrates a flow chart illustrating a method of coding video information, according to one embodiment of the present disclosure.

FIG. 5 is a flowchart illustrating a method 500 for coding video information, according to an embodiment of the present disclosure. The steps illustrated in FIG. 5 may be performed by an encoder (e.g., the video encoder as shown in FIG. 2A or FIG. 2B), a decoder (e.g., the video decoder as shown in FIG. 3A or FIG. 3B), or any other component. For convenience, method 500 is described as performed by a coder, which may be the encoder, the decoder, or another component. The method may be a method of decoding, or a method of encoding.

The method 500 begins at block 501. In block 505, the coder determines whether a reference layer is in a bitstream. In one embodiment, the reference layer may be coded using an AVC codec and/or a non-HEVC codec. In some aspects, the coder, or the processor determines whether the reference layer is included in the bitstream based upon a value of a flag or other indicator of the codec. Such a flag or other indicator may be received from the external source, or may be determined by the method. In some aspects, the means for determining may include a processor. In the video encoding process, the determining whether the reference layer is included in the bitstream based upon a value of a flag or other indicator of the codec may include generating one or more syntax structures into the bitstream. In the video decoding process, the determining whether the reference layer is included in the bitstream based upon a value of a flag or other indicator of the codec may include decoding one or more syntax structures from the bitstream. Details of example syntax structures are described herein.

Next, the coder determines whether or not to process an indication for the reference layer, based on whether the reference layer is included in the bitstream, at block 510. For example, this determination may be based on whether or not the indication would be rendered redundant or unnecessary, based upon whether the reference layer is included in the bitstream. For example, certain indications may have a known value when a reference layer is not included in a bitstream, such that signaling the indication may be unnecessary. In some aspects, the indication may include an indication of a type of inter-layer prediction that a given layer may be used for, such as motion prediction and sample prediction. In some aspects, the indication may be an indication of a number of sub-layers for a particular layer, which may be unnecessary to signal for a base layer that is being coded by external source. In some aspects, the indication may be an indication of whether or not a given layer may be used for inter-layer prediction for another layer. In some aspects, the means for determining may include a processor.

At block 515, the coder processes, in a video bitstream, and indication for the reference layer if the reference layer is included in the bitstream. For example, certain indications may be processed only when the reference layer is included in the bitstream, such as when the reference layer is coded using an HEVC codec. In other situations, these indications may not be processed, as they may be unnecessary or redundant. In some aspects, the means for determining may include a processor.

At block 520, the coder codes the video information based at least in part on the processed indication. In some aspects, the means for coding may include a processor. The method 500 ends at block 525.

As discussed above, one or more components of video encoder 20 of FIG. 2A, video encoder 21 of FIG. 2B, video decoder 30 of FIG. 3A, or video decoder 31 of FIG. 3B (e.g., inter-layer prediction unit 128 and/or inter-layer prediction unit 166) may be used to implement any of the techniques discussed in the present disclosure, such as determining whether the reference layer codec is the particular type of codec, receiving the decoded base layer picture, storing the decoded base layer picture, and emptying the memory.

Storing Decoded Base Layer Pictures in the DPB

In some aspects, the decoded base layer picture provided by external source (such as a base layer decoder) for an access unit is not stored in the DPB, yet it is marked as "used for long-term reference" and later on used for inter-layer prediction reference. Accordingly, this may be problematic, as such a decoded picture may not be used for reference, such as for inter-layer prediction reference, unless it is in the DPB.

Because the base layer (layer ID 0) in the video stream is a non-HEVC layer, the decoder may not receive a coded picture in layer 0. As before, the decoder here refers to the SHVC decoder, which may be used to decode one or more enhancement layers. Rather, the base layer may be decoded using external source. These external sources may include, for example, an AVC decoder which is configured to decode the base layer and to pass the decoded base layer picture to the SHVC decoder. In addition to the decoded base layer picture, the external source may be configured to provide certain other information to the decoder as well, as described above.

Accordingly, the base layer may contain a decoded picture, with layer ID of 0. The decoder may be configured to store the decoded base layer picture in the sub-DPB, and to mark this picture as "used for long-term reference." Further, if an access unit has at least one picture with a layer ID greater than 0, the PicOrderCntVal of the base layer decoded picture is set to be equal to the PicOrderCntVal of any other picture in the access unit. Otherwise, the base layer picture is discarded and the sub-DPB for the base layer is set to be empty, if there are no other pictures in the access unit aside from the base layer decoded picture.

When the access unit has at least one picture with a layer ID greater than 0, after all the pictures in the access unit are decoded, the sub-DPB for the base layer is set to be empty. That is, the sub-DPB which contains the decoded base layer picture may be emptied after each picture in the access unit has been decoded. The size of the sub-DPB may be set equal to 1. Thus, the sub-DPB may store one picture, and each access unit may include one base layer decoded picture.

Example Flowchart #3

Figure 6:
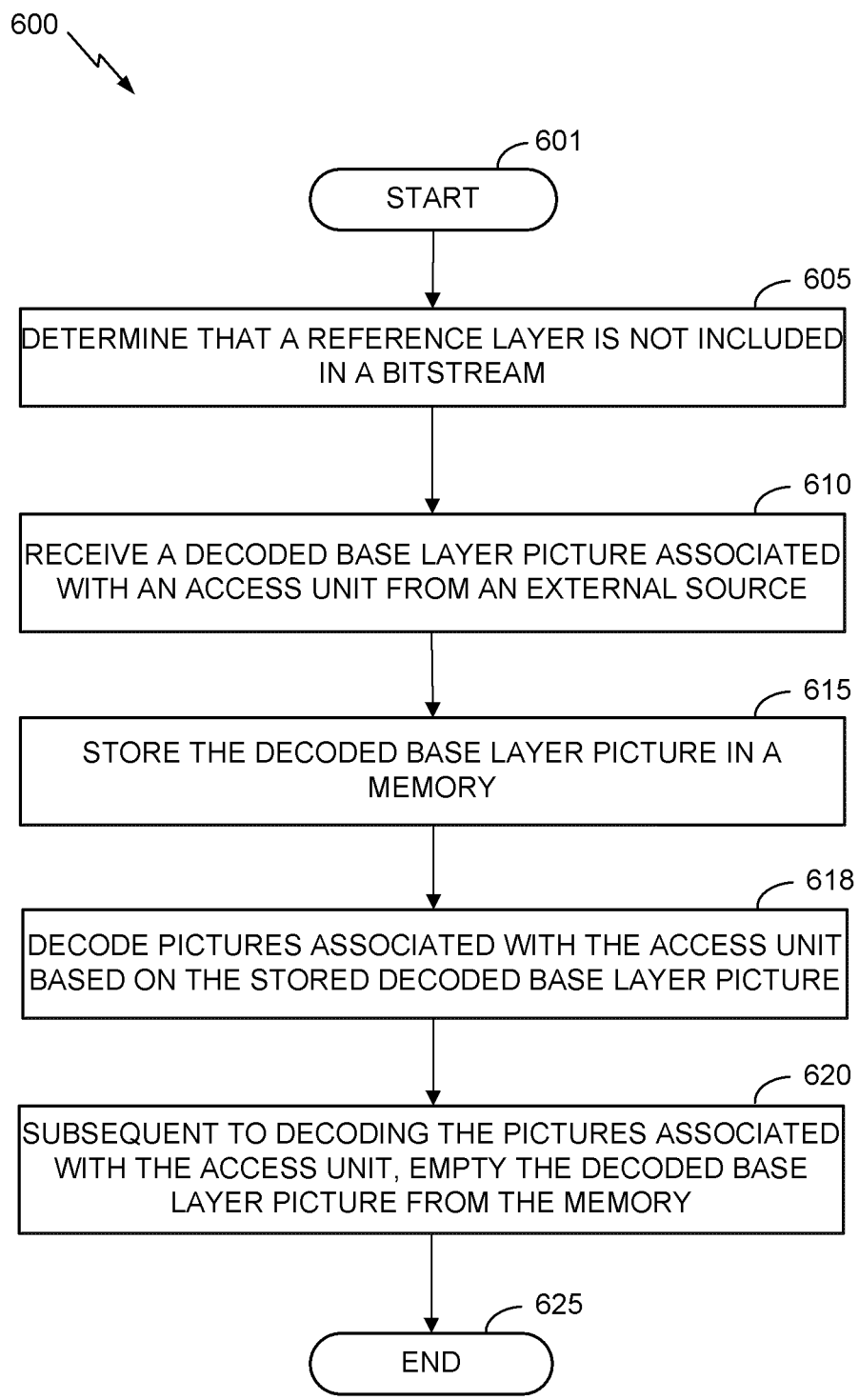
FIG. 6 illustrates a flow chart illustrating a method of coding video information, according to one embodiment of the present disclosure.

FIG. 6 is a flowchart illustrating a method 600 for decoding video information, according to an embodiment of the present disclosure. The steps illustrated in FIG. 6 may be performed by a decoder (e.g., the video decoder as shown in FIG. 3A or FIG. 3B), or any other component. In some aspects, the method determines whether the reference layer is included in the bitstream based upon a value of a flag or a variable, such as a value included in a one of a video parameter set, a sequence parameter set, a picture parameter set, or an adaptation parameter set. Such a flag or other indicator may be received from the external source, or may be determined by the method. In some aspects, the means for determining may include a processor.

The method 600 begins at block 601. In block 605, the decoder determines that a reference layer is not included in a bitstream. In one example, the reference layer may be coded according to an AVC codec and/or a non-HEVC codec. In some aspects, the method determines whether the bitstream includes a reference layer based upon a value of a flag or other indicator of the codec. The value may be included in a one of a video parameter set, a sequence parameter set, a picture parameter set, or an adaptation parameter set. Such a flag or other indicator may be received from the external source, or may be determined by the method. In some aspects, the means for determining may include a processor.

Next, the decoder receives a decoded base layer picture from an external source, the decoded base layer picture associated with an access unit, in block 610. In one aspect, the external source may include another decoder, such as a decoder which is configured to use an AVC codec, or a decoder which is configured to use a non-HEVC codec. For example, the external source may include a second decoder. In some aspects, there may one decoded base layer picture associated with each access unit. In some aspects, the means for determining may include a processor.

The decoder then stores the decoded base layer picture in a memory in block 615. The memory may include a DPB or a sub-DPB. In some aspects, the sub-DPB may be sized such that it can hold one, and only one, decoded base layer picture. In some aspects, the decoder may further provide an indication that the decoded base layer picture may be used for long-term reference. In some aspects, the means for storing may include a memory.

The decoder then decodes pictures associated with the access unit based on the stored decoded base layer picture in block 618. The means for decoding may include a processor. The coder, subsequent to decoding the pictures associated with the access unit, empties the decoded base layer picture from the memory in block 620. In some aspects, the means for emptying may include a processor. The method 600 ends at block 625.

As discussed above, one or more components of video encoder 20 of FIG. 2A, video encoder 21 of FIG. 2B, video decoder 30 of FIG. 3A, or video decoder 31 of FIG. 3B (e.g., inter-layer prediction unit 128 and/or inter-layer prediction unit 166) may be used to implement any of the techniques discussed in the present disclosure, such as determining whether the reference layer codec is the particular type of codec, receiving the decoded base layer picture, storing the decoded base layer picture, and emptying the memory.

Signaling an IRAP Base Layer Picture

In some aspects, it may be beneficial for a decoder, such as an SHVC decoder operating on one or more enhancement layers, to be aware of certain properties of the non-HVEC base layer. For example, it may be desirable for the decoder to require that the external source signal whether a given base layer picture is an TRAP picture or not. If the base layer picture is an TRAP picture, it may be desirable if the external source further signals the TRAP NAL unit type, which may specify and IDR picture, a CRA picture, or a BLA picture.

When a non-HEVC base layer is used, each access unit may include a decoded base layer picture (with layer ID equal to 0) by an external source. When such a picture is not provided, no base layer picture may be used for inter-layer prediction for that access unit.

When a decoded base layer picture is provided by the external source, the external source may also provide other information. For example, the external source may provide decoded sample values. If the value chroma_format_idc is equal to 0, the external source may provide one sample array $S_L$ as a decoded sample value. Otherwise, the external source may provide 3 sample arrays, $S_L$, $S_{Cb}$, and $S_{Cr}$.

The external source may also provide an indication of whether or not the decoded base layer picture is an TRAP picture. For example, this indication may be found in a variable named BlIrapPicFlag. This base layer TRAP picture flag may indicate whether or not the base layer picture is an TRAP picture. A value of 1 may indicate that the base layer picture is an TRAP picture. Similarly, if a variable named IrapPicFlag is equal to 1, this may indicate that the decoded base layer picture is a non-TRAP picture.

When the base layer picture is an TRAP picture, the external source may further provide the TRAP NAL unit type. This may specify an IDR picture, a CRA picture, or a BLA picture. For example, this may be provided as a value for a variable nal_unit_type. This variable may have a value of IDR_W_RADL, CRA_NUT, or BLA_W_LP, which may indicate if the TRAP picture is an IDR picture, a CRA picture, or a BLA picture, respectively.

For example, the NAL unit type variable may indicate that the TRAP base layer picture is IDR_W_RADL. This value may indicate that decoded picture is an IDR picture and was decoded from a Rec. ITU-T H.264| ISO/IEC 14496-10 IDR picture.

In some aspects, the NAL unit type variable may indicate that the TRAP base layer picture is CRA_NUT. This specifies that the decoded picture is a CRA picture and was decoded from a Rec. ITU-T H.264|ISO/IEC 14496-10 coded picture that was associated with a Rec. ITU-T H.264|ISO/IEC 14496-10 recovery point SEI message with recovery_frame_cnt equal to 0 and broken_link_flag equal to 0.

In some aspects, the NAL unit type variable may indicate that the TRAP base layer picture is BLA_W_LP. This specifies that the decoded picture is a BLA picture and was decoded from a Rec. ITU-T H.264|ISO/IEC 14496-10 coded picture that was associated with a Rec. ITU-T H.264|ISO/IEC 14496-10 recovery point SEI message with recovery_frame_cnt equal to 0 and broken_link_flag equal to 1.

Optionally, the external source may also indicate whether the picture is a frame or a field. Then the picture is a field, the external source may indicate the field parity, such as a top field or a bottom field. If the external source does not indicate this, the decoded picture may be inferred to be a frame picture.

Example Flowchart #4

Figure 7:
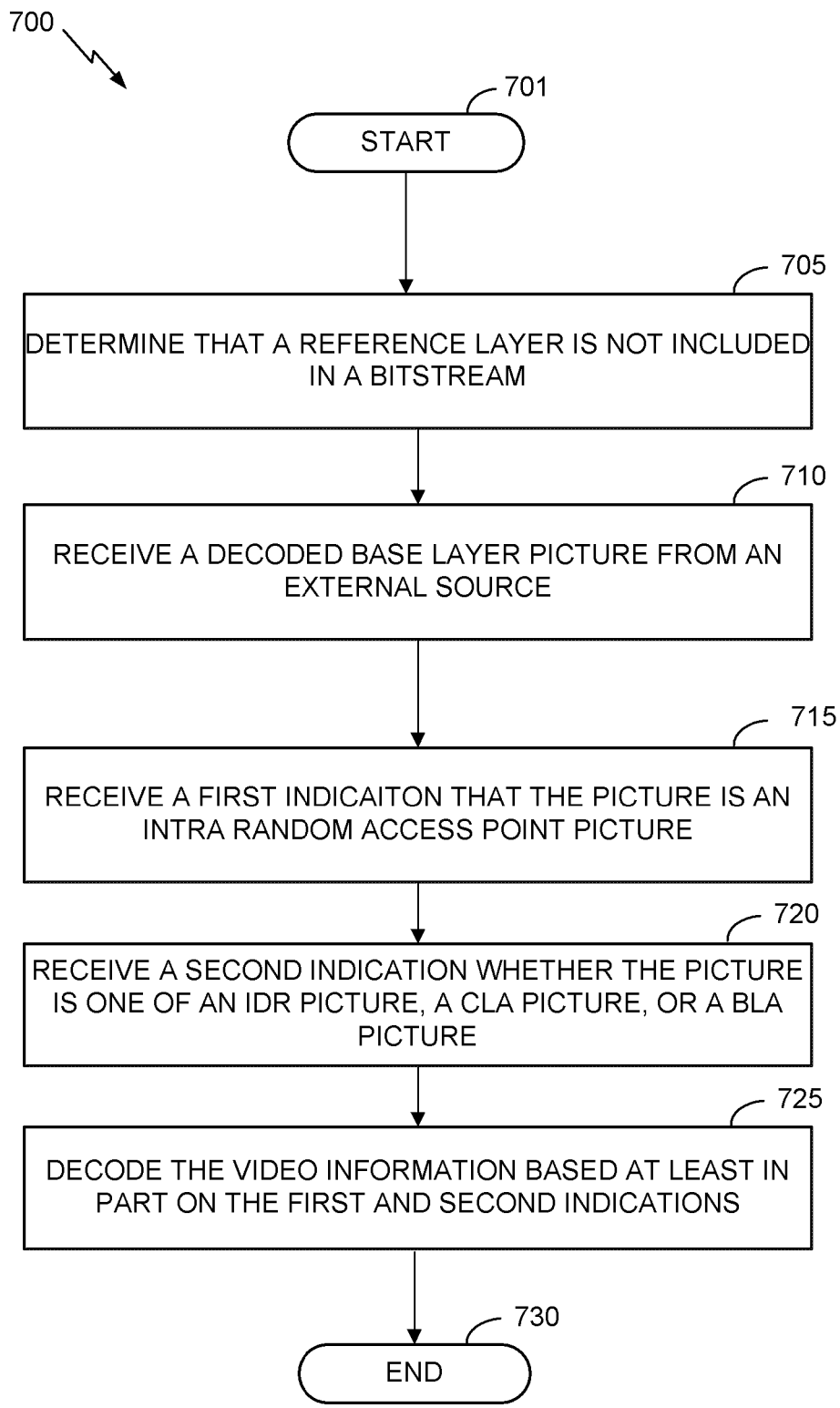
FIG. 7 illustrates a flow chart illustrating a method of coding video information, according to another embodiment of the present disclosure.

FIG. 7 is a flowchart illustrating a method 700 for coding video information, according to an embodiment of the present disclosure. The steps illustrated in FIG. 7 may be performed by an encoder (e.g., the video encoder as shown in FIG. 2A or FIG. 2B), a decoder (e.g., the video decoder as shown in FIG. 3A or FIG. 3B), or any other component. For convenience, method 700 is described as performed by a coder, which may be the encoder, the decoder, or another component.

The method 700 begins at block 701. In block 705, the decoder determines that a reference layer is not included in a bitstream. In one example, the reference layer is decoded according to an AVC codec and/or according to a non-HEVC codec. In some aspects, the method determines whether the reference layer is included in the bitstream based upon a value of a flag or other indicator of the codec. Such a flag or other indicator may be received from the external source, or may be determined by the method. In some aspects, the means for determining may include a processor. In some aspects, the value may be included in a one of a video parameter set, a sequence parameter set, a picture parameter set, or an adaptation parameter set.

The decoder then receives, from an external source, a decoded base layer picture, in block 710. In some aspects, the base layer picture may be associated with an access unit. In some aspects, the external source may include another decoder. In some aspects, the other decoder may be an AVC decoder. In some aspects, the means for receiving may include a processor.

At block 715, the decoder receives, from the external source, an indication that the picture is an TRAP picture. For example, this indication may include a flag which indicates that the base layer picture is an TRAP picture. In some aspects, the means for receiving may include a processor. At block 720, the decoder receives a second indication whether the picture is one of an IDR picture, a CLA picture, or a BLA picture. In some aspects, the means for receiving may include a processor. In some aspects, the second indication may be a syntax element having three or more possible values. At block 730, the decoder codes the video information based at least in part on the first and second indications. In some aspects, the means for decoding may include a processor. The method 700 ends at block 730.

As discussed above, one or more components of video encoder 20 of FIG. 2A, video encoder 21 of FIG. 2B, video decoder 30 of FIG. 3A, or video decoder 31 of FIG. 3B (e.g., inter-layer prediction unit 128 and/or inter-layer prediction unit 166) may be used to implement any of the techniques discussed in the present disclosure, such as determining whether the reference layer codec is the particular type of codec, receiving the decoded base layer picture, storing the decoded base layer picture, and emptying the memory.

Additional Aspects of Design

Generally, for a current access unit, either no base layer information is provided by the external source, or the external source must provide at least proscribed set of information. If no information is provided, the base layer picture will not be used for inter-layer prediction for the current access unit, regardless of whether a base layer picture was provided in the access unit in the base layer bitstream. Alternatively, the external source may be proscribed to provide: (1) the decoded sample values of the base layer decoded picture, (2) the representation format of the base layer decoded picture, including the width and height in luma samples, the colour format, the separate colour plane flag, the luma bit depth, and the chroma bit depth, (3) information on whether the base layer picture is an IRAP picture or not, and if yes, the TRAP NAL unit type, which may specify an IDR picture, a CRA picture, or a BLA picture, and optionally, (4) whether the picture is a frame or a field, and when a field, the field parity (a top field or a bottom field). When information on whether the picture is a frame or a field is not provided, the decoded picture may be inferred to be a frame picture.

The picture order count of the base layer decoded picture may be set equal to the picture order count of any enhancement layer picture, if present, in the same access unit. Note that in this case, the actual picture order count of a base layer picture decoded by the base layer decoder in such a scalable or multiview codec might be different than the picture order count value of the same picture when it is decoded by an AVC decoder. When no enhancement layer picture is present for the access unit, the base layer decoded picture is not used and can be discarded.

The base layer decoded picture may be marked as "used for long-term reference." For CPB operations, the base layer may be considered as having zero bits. For DPB operations, only decoded pictures of enhancement layers may be considered.

When the base layer is non-HEVC, general_profile_space in the first profile_tier_level( ) syntax structure in a VPS may be set equal to 1. In this case, the codec type is signaled, and when AVC is indicated, the three-byte AVC profile and level information is signaled, and the rest of the bits in the profile_tier_level( ) syntax structure are all reserved.

When the base layer is non-HEVC, it may be required that the signaling of the three DPB parameters (max sub-DPB size, max reorder, and max latency) use the least amount of bits. It may also be required that none of the hrd_parameters( ) syntax structures apply to layer set 0 (the base layer only).

When the base layer is non-HEVC, unnecessary signaling for the base layer in the VPS extension, including VPS VUI, may be avoided, such as sub_layers_vps_max_minus1[0], max_tid_il_ref_pics_plus1[0][j], and direct_dependency_type[i][0].

Additional Code Segments

The following example code segment may be used as part of the VPS VUI syntax, and may provide for setting or not setting certain flags based, at least in part, on whether a base layer is an HEVC layer:

|  | Descriptor |
| --- | --- |
| vps_vui( ){<br>  ...<br>  if( bit_rate_present_vps_flag \|\| pic_rate_present_vps_flag )<br>    for( i = HevcBaseLayerFlag ? 0 : 1; i <= vps_number_layer_sets_minus1; i++ )<br>      for( j = 0; j <= vps_max_sub_layers_minus1; j++ ) {<br>        if( bit_rate_present_vps_flag ) | |

-continued

| | Descriptor |
|---|---|
| bit_rate_present_flag[ i ][ j ] | u(1) |
| if( pic_rate_present_vps_flag ) | |
|   pic_rate_present_flag[ i ][ j ] | u(1) |
| if( bit_rate_present_flag[ i ][ j ] ) { | |
|   avg_bit_rate[ i ][ j ] | u(16) |
|   max_bit_rate[ i ][ j ] | u(16) |
| } | |
| if( pic_rate_present_flag[ i ][ j ] ) { | |
|   constant_pic_rate_idc[ i ][ j ] | u(2) |
|   avg_pic_rate[ i ][ j ] | u(16) |
| } | |
| } | |
| tiles_not_in_use_flag | u(1) |
| if( !tiles_not_in_use_flag ) { | |
|   for( i = HevcBaseLayerFlag ? 0 : 1; i <= MaxLayersMinus1; i++ ) { | u(1) |
|     tiles_in_use_flag[ i ] | |
|     if( tiles_in_use_flag[ i ] ) | |
|       loop_filter_not_across_tiles_flag[ i ] | u(1) |
|   } | |
|   for( i = 1; i <= MaxLayersMinus1; i++ ) | |
|     for( j = 0; j < NumDirectRefLayers[ layer_id_in_nuh[ i ] ]; j++ ) { | |
|       layerIdx = LayerIdxInVps[ RefLayerId[ layer_id_in_nuh[ i ] ][ j ] ] | |
|       if( tiles_in_use_flag[ i ] && tiles_in_use_flag[ layerIdx ] ) | |
|         tile_boundaries_aligned_flag[ i ][ j ] | u(1) |
|     } | |
| } | |
| wpp_not_in_use_flag | |
| if( !wpp_not_in_use_flag ) | |
|   for( i = HevcBaseLayerFlag ? 0 : 1; i <= MaxLayersMinus1; i++ ) | |
|     wpp_in_use_flag[ i ] | u(1) |
| if( HevcBaseLayerFlag ) { | |
|   single_layer_for_non_irap_flag | u(1) |
|   higher_layer_irap_skip_flag | u(1) |
| } | |
| ilp_restricted_ref_layers_flag | u(1) |
| if( ilp_restricted_ref_layers_flag ) | |
|   for( i = HevcBaseLayerFlag ? 1 : 2; i <= MaxLayersMinus1; i++ ) | |
|     for( j = 0; j < NumDirectRefLayers[ layer_id_in_nuh[ i ] ]; j++ ) { | |
|       min_spatial_segment_offset_plus1[ i ][ j ] | ue(v) |
|       if( min_spatial_segment_offset_plus1[ i ][ j ] > 0 ) { | |
|         ctu_based_offset_enabled_flag[ i ][ j ] | u(1) |
|         if( ctu_based_offset_enabled_flag[ i ][ j ] ) | |
|           min_horizontal_ctu_offset_plus1[ i ][ j ] | ue(v) |
|       } | |
|     } | |
| ... | |
| } | |

The following example code segment may be used as part of the profile, tier and level syntax, and may provide for setting or not setting certain flags based on a value of general_profile_space (which itself may be set based on a codec used for a base layer of a video stream):

| | Descriptor |
|---|---|
| profile_tier_level( profilePresentFlag, maxNumSubLayersMinus1 ) { | |
|   if( profilePresentFlag ) { | |
|     general_profile_space | u(2) |
|     if( general_profile_space == 0 ) { | |
|       general_tier_flag | u(1) |
|       general_profile_idc | u(5) |
|       for( j = 0; j < 32; j++ ) | |
|         general_profile_compatibility_flag[ j ] | u(1) |
|       general_progressive_source_flag | u(1) |
|       general_interlaced_source_flag | u(1) |
|       general_non_packed_constraint_flag | u(1) |
|       general_frame_only_constraint_flag | u(1) |
|       general_reserved_zero_44bits | u(44) |
|     } | |
|   } | |
|   if( general_profile_space == 0 ) { | |
|     general_level_idc | u(8) |
|     for( i = 0; i < maxNumSubLayersMinus1; i++ ) { | |
|       sub_layer_profile_present_flag[ i ] | u(1) |
|       sub_layer_level_present_flag[ i ] | u(1) |
|     } | |
|     if( maxNumSubLayersMinus1 > 0 ) | |
|       for( i = maxNumSubLayersMinus1; i < 8; i++ ) | |
|         reserved_zero_2bits[ i ] | u(2) |
|     for( i = 0; i < maxNumSubLayersMinus1; i++ ) | |
|       if( sub_layer_profile_present_flag[ i ] ) { | |
|         sub_layer_profile_space[ i ] | u(2) |
|         sub_layer_tier_flag[ i ] | u(1) |
|         sub_layer_profile_idc[ i ] | u(5) |
|         for( j = 0; j < 32; j++ ) | |
|           sub_layer_profile_compatibility_flag[ i ][ j ] | u(1) |
|         sub_layer_progressive_source_flag[ i ] | u(1) |
|         sub_layer_interlaced_source_flag[ i ] | u(1) |
|         sub_layer_non_packed_constraint_flag[ i ] | u(1) |
|         sub_layer_frame_only_constraint_flag[ i ] | u(1) |
|         sub_layer_reserved_zero_44bits[ i ] | u(44) |
|       } | |
|       if( sub_layer_level_present_flag[ i ] ) | |
|         sub_layer_level_idc[ i ] | u(8) |
|     } | |
|   } | |
|   if( general_profile_space == 1 ) { | |
|     base_layer_codec_type | u(6) |
|     if( base_layer_codec_type == 0 ) | |
|       avc_profile_level_idc | u(24) |
|     else | |
|       reserved_zero_24bits | u(24) |
|     reserved_zero_32bits | u(32) |
|   } | |
| } | |

In some aspects, when a first profile_tier_level( ) syntax structure in the VPS has a general_profile_space flag equal to 0, the variable HevcBaseLayerFlag may be set equal to 1 and the variable AvcBaseLayerFlag may be set equal to 0. For example, the variable HevcBaseLayerFlag may be used to indicate whether the base layer of a particular video is encoded based upon an HEVC codec or not. Similarly, the variable AvcBaseLayerFlag may be used to indicate whether the base layer of a particular video is encoded based upon an AVC codec or not.

Alternatively, when the first profile_tier_level( ) syntax structure has general_profile_space equal to 1 and base_later_codec_type equal to 0, the variable AvcBaseLayerFlag may be set equal to 1, and the variable HevcBaseLayerFlag may be set equal to 0. Further, in this scenario, the value of vps_sub_layer_ordering_info_present_flag may be equal to 0 and the values of vps_max_dec_pic_buffering_minus1[i], vps_max_num_reorder_pics[i], and vps_max_latency_increase_plus1 [i] may all be equal to 0 for all possible values of i. In this scenario, decoders may be configured to ignore the values of vps_sub_layer_ordering_info_present_flag, vps_max_dec_pic_buffering_minus1[i], vps_max_num_reorder_pics[i], and vps_max_latency_increase_plus1 [i], and the value of hrd_layer_set_idx[i] may be greater than 0.

Generally, a vps_extension offset flag may specify a byte offset, starting from the beginning of the VPS NAL unit, of the next set of fixed-length coded information starting from vps_vui_present_flag, when present, in the VPS NAL unit. When present, emulation prevention bytes that appear in the VPS NAL unit are counted for purposes of byte offset identification.

In some aspects, when the base layer is not coded using an HEVC codec (and therefore, the flag HevcBaseLayerFlag is equal to 0, it may be required that a value of sps_scaling_list_ref_layer_id shall be greater than 0. Generally, sps_scaling_list_ref_layer_id specifies the layer for which the active SPS is associated with the same scaling list data as the current SPS.

Generally, pps_scaling_list_ref_layer_id specifies the layer for which the active PPS has the same scaling list data as the current PPS. The value of pps_scaling_list_ref_layer_id shall be in the range of 0 to 62, inclusive. In some aspects, when the base layer of a video is not an HEVC base layer (that is, HevcBaseLayerFlag is equal to 0), it may be a requirement of bitstream conformance for pps_scaling_list_ref_layer_id to be greater than 0.

Profile, Tier and Level Semantics

Generally, when a value of general_profile_space is not provided, that value is inferred to be 0. However, if the value of general_profile_space is equal to 1, a value of base_layer_codec_type equal to 0 may specify that the base layer conforms to Rec. ITU-T H.264|ISO/IEC 14496-10. Other values of base_layer_codec_type, in the range of 1 to 63, inclusive, may be reserved for future use by ITU-T|ISO/IEC.

Further, avc_base_profile_level_idc may indicate the conformance point of the Rec. ITU-T H.264|ISO/IEC 14496-10 base layer. For example, avc_base_profile_level_idc may have the same value as the three bytes in Rec. ITU-T H.264|ISO/IEC 14496-10 comprised of profile_idc, constraint_set0_flag, constraint_set1_flag, constraint_set2_flag, constraint_set3_flag, constraint_set4_flag, constraint_set5_flag, reserved_zero_2bits, and level_idc of the Rec. ITU-T H.264|ISO/IEC 14496-10 sequence parameter set.

Additionally, reserved_zero_24bits and reserved_zero_32bits shall both be equal to 0, and other values may be reserved for future use by ITU-T ISO/IEC. Decoders may be configured to ignore the values of both reserved_zero_24bits and reserved_zero_32bits. For example, the following code segment may be used to set values of reserved_zero_24bits and reserved_zero_32bits when general_profile_space is set to 1:

| | Descriptor |
|---|---|
| profile_tier_level( profilePresentFlag, maxNumSubLayersMinus1 ) { | |
| ... | |
|   if( general_profile_space = = 1 ) { | |
|     base_layer_codec_type | u(6) |
|     if( base_layer_codec_type = = 0 ) | |
|       avc_profile_level_idc | u(24) |
|     else | |
|       reserved_zero_24bits | u(24) |
|       reserved_zero_32bits | u(32) |
|   } | |

General Decoding Process

Generally, when the base layer of a video is an AVC base layer (that is, when AvcBaseLayerFlag is equal to 1), the following applies:

There may be no coded picture with layer ID 0 in the bitstream. This is because the base layer is a non-HEVC layer, and so the picture for the base layer may come from an external source, rather than be included in the bitstream. The size of the sub-DPB for layer ID 0 is set equal to one.

The values of pic_width_in_luma_samples, pic_height_in_luma_samples, chroma_format_idc, separate_colour_plane_flag, bit_depth_luma_minus8, and bit_depth_chroma_minus8 for decoded pictures with layer ID 0 are provided by external source.

For each access unit, a decoded picture with layer ID 0 may be provided by external source. When not provided, no picture with layer ID 0 is used for inter-layer prediction for the current access unit. When such a picture is provided, the picture may also include decoded sample values (1 sample array SL if chroma_format_idc is equal to 0 or 3 sample arrays SL, SCb, and SCr otherwise), the value of the variable BlIrapPicFlag, and when BlIrapPicFlag is equal to 1, the value of nal_unit_type of the decoded picture. Further, BlIrapPicFlag equal to 1 specifies that the decoded picture is an IRAP picture. IrapPicFlag equal to 1 specifies that the decoded picture is a non-IRAP picture. The provided value of nal_unit_type of the decoded picture shall be equal to IDR_W_RADL, CRA_NUT, or BLA_W_LP. Generally, a value of nal_unit_type equal to IDR_W_RADL specifies that the decoded picture is an IDR picture and was decoded from a Rec. ITU-T H.264|ISO/IEC 14496-10 IDR picture. A value of nal_unit_type equal to CRA_NUT specifies that the decoded picture is a CRA picture and was decoded from a Rec. ITU-T H.264|ISO/IEC 14496-10 coded picture that was associated with a Rec. ITU-T H.264|ISO/IEC 14496-10 recovery point SEI message with recovery_frame_cnt equal to 0 and broken_link_flag equal to 0. A value of nal_unit_type equal to BLA_W_LP specifies that the decoded picture is a BLA picture and was decoded from a Rec. ITU-T H.264 ISO/IEC 14496-10 coded picture that was associated with a Rec. ITU-T H.2641 ISO/IEC 14496-10 recovery point SEI message with recovery_frame_cnt equal to 0 and broken_link_flag equal to 1. The external source may optionally indicate whether the picture is a frame or a field, and when a field, the field parity (a top field or a bottom field). If not provided, the decoded picture is inferred to be a frame picture.

Generally, the decoded picture with layer ID 0 is stored in the sub-DPB and is marked as "used for long-term reference." If the access unit has at least one picture with layer ID greater than 0, the PicOrderCntVal of the decoded picture for layer ID 0 is set equal to the PicOrderCntVal of any picture with layer ID greater than 0 in the access unit. Otherwise, the decoded picture for layer ID 0 is discarded and the sub-DPB for layer ID 0 is set to be empty. When the access unit has at least one picture with layer ID greater than 0, after all pictures in the access unit are decoded, the sub-DPB for the layer with layer ID 0 is set to be empty.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. A method of coding video information, the method comprising:
   determining whether a reference layer is included in a bitstream;
   determining, based upon whether the reference layer is included in the bitstream, whether or not to process an indication;
   if the reference layer is included in the bitstream, processing, in the bitstream, the indication; and
   coding the video information based at least in part on the processed indication.

2. The method of claim 1, wherein the reference layer is coded according to a non-HEVC (High Efficiency Video Coding) codec.

3. The method of claim 1, wherein the reference layer is coded according to an Advanced Video Coding (AVC) codec.

4. The method of claim 1, wherein determining whether the reference layer is included in the bitstream comprises determining whether the reference layer is included in the bitstream based upon a value included in a one of a video parameter set, a sequence parameter set, a picture parameter set, or an adaptation parameter set.

5. The method of claim 1, wherein determining, based upon whether the reference layer is included in the bitstream, whether or not to process the indication comprises determining whether or not the indication is redundant based upon whether the reference layer is included in the bitstream.

6. The method of claim 1, wherein the indication comprises an indication that the reference layer (RL) may be used for one or more of sample prediction and motion prediction of at least one enhancement layer (EL).

7. The method of claim 1, wherein the indication comprises an indication of a number of sub-layers for a particular layer.

8. The method of claim 1, wherein the indication comprises an indication of whether a first layer may be used for inter-layer prediction for a second layer.

9. The method of claim 1, wherein the indication comprises one or more values in a data array.

10. The method of claim 1, further comprising generating one or more syntax elements in the bitstream comprising the indication of one or more parameters, wherein coding video information comprises encoding video information.

11. The method of claim 1, further comprising generating one or more syntax elements in the bitstream comprising the indication of one or more parameters, wherein coding video information comprises decoding video information.

12. An apparatus configured to code video information, the apparatus comprising:
- a memory configured to store video information associated with a bitstream;
- a processor in communication with the memory, the processor configured to:
  - determine whether a reference layer is included in the bitstream;
  - determine, based upon whether the reference layer is included in the bitstream, whether or not to process an indication;
  - if the reference layer is included in the bitstream, process, in a video bitstream, the indication; and
  - code the video information based at least in part on the processed indication.

13. The apparatus of claim 12, wherein the reference layer is coded according to a non-HEVC (High Efficiency Video Coding) codec.

14. The apparatus of claim 12, wherein the reference layer is coded according to an Advanced Video Coding (AVC) codec.

15. The apparatus of claim 12, wherein determining whether the reference layer is included in the bitstream comprises determining whether the reference layer is included in the bitstream based upon a value included in a one of a video parameter set, a sequence parameter set, a picture parameter set, or an adaptation parameter set.

16. The apparatus of claim 12, wherein determining, based upon whether the reference layer is included in the bitstream, whether or not to process the indication comprises determining whether or not the indication is redundant based upon whether the reference layer is included in the bitstream.

17. The apparatus of claim 12, wherein the indication comprises an indication that the reference layer may be used for one or more of sample prediction and motion prediction of at least one enhancement layer (EL).

18. The apparatus of claim 12, wherein the indication comprises an indication of a number of sub-layers for a particular layer.

19. The apparatus of claim 12, wherein the indication comprises an indication of whether a first layer may be used for inter-layer prediction for a second layer.

20. The apparatus of claim 12, wherein the indication comprises one or more values in a data array.

21. The apparatus of claim 12, the processor further configured to generate one or more syntax elements in the bitstream comprising the indication of one or more parameters, and wherein coding video information comprises encoding video information.

22. The apparatus of claim 12, the processor further configured to generate one or more syntax elements in the bitstream comprising the indication of one or more parameters, and wherein coding video information comprises decoding video information.

23. A non-transitory computer readable medium comprising code that, when executed, causes an apparatus to perform a process comprising:
- determining whether a reference layer is included in a bitstream;
- determining, based upon whether the reference layer is included in the bitstream, whether or not to process an indication;
- if the reference layer is included in the bitstream, processing, in a video bitstream, the indication; and
- coding the video information based at least in part on the processed indication.

24. The non-transitory computer readable medium of claim 23, wherein the reference layer is coded according to at least one of a non-HEVC (High Efficiency Video Coding) codec and an Advanced Video Coding (AVC) codec.

25. The non-transitory computer readable medium of claim 23, wherein the indication comprises an indication that the reference layer may be used for one or more of sample prediction and motion prediction of at least one enhancement layer (EL).

26. The non-transitory computer readable medium of claim 23, wherein the indication comprises an indication of a number of sub-layers for a particular layer.

27. A video coding device configured to code video information, the video coding device comprising:
- means for determining whether a reference layer is included in a bitstream;
- means for determining, based upon whether the reference layer is included in the bitstream, whether or not to process an indication;
- means for processing the indication in a video bitstream if the reference layer is included in the bitstream; and
- means for coding the video information based at least in part on the processed indication.

28. The video coding device of claim 27, wherein the reference layer is coded according to at least one of a non-HEVC (High Efficiency Video Coding) codec and an Advanced Video Coding (AVC) codec.

29. The video coding device of claim 27, wherein the indication comprises an indication that the reference layer may be used for one or more of sample prediction and motion prediction of at least one enhancement layer (EL).

30. The video coding device of claim 27, wherein the indication comprises an indication of a number of sub-layers for a particular layer.

* * * * *